US012735055B2

(12) United States Patent
Sharma et al.

(10) Patent No.: US 12,735,055 B2
(45) Date of Patent: Sep. 15, 2026

(54) SYSTEM AND METHOD FOR ELECTRIC VEHICLE OPERATIONAL OPTIMIZATION

(71) Applicant: ACCENTURE GLOBAL SOLUTIONS LIMITED, Dublin (IE)

(72) Inventors: Amandeep Sharma, Mohali (IN); Sudhindra Krishnamurthy, Sunnyvale, CA (US); Prince Kumar, Gurugram (IN); Sudheer Sure, Hyderabad (IN)

(73) Assignee: ACCENTURE GLOBAL SOLUTIONS LIMITED, Dublin (IE)

( * ) Notice: Subject to any disclaimer, the term of this patent is extended or adjusted under 35 U.S.C. 154(b) by 7 days.

(21) Appl. No.: 19/087,091

(22) Filed: Mar. 21, 2025

(65) Prior Publication Data

US 2025/0296580 A1 Sep. 25, 2025

Related U.S. Application Data

(60) Provisional application No. 63/568,572, filed on Mar. 22, 2024.

(51) Int. Cl.
*B60W 50/02* (2012.01)
*B60L 15/20* (2006.01)
(Continued)

(52) U.S. Cl.
CPC ..... *B60W 50/0205* (2013.01); *B60L 15/2045* (2013.01); *B60L 58/12* (2019.02);
(Continued)

(58) Field of Classification Search
CPC ......... B60W 50/0205; B60W 50/0097; B60W 30/182; B60W 60/0015; B60W 60/023;
(Continued)

(56) References Cited

U.S. PATENT DOCUMENTS

2020/0070679 A1* 3/2020 Wang ...................... B60L 58/21
2024/0142534 A1* 5/2024 Ropel ...................... B60L 3/12

FOREIGN PATENT DOCUMENTS

CN 113189495 A * 7/2021 ............ G01K 13/00
CN 116700296 A * 9/2023

* cited by examiner

*Primary Examiner* — David P. Merlino
(74) *Attorney, Agent, or Firm* — Mannava & Kang, P.C.

(57) ABSTRACT

A system and method for electric vehicle operational optimization is disclosed. The system comprises a memory storing processor-executable instructions and a processor, communicably coupled with the memory. The system obtains input data and predict health and performance parameters. The system generates computer simulated instances which emulate a behavior and a performance of the electric vehicle. The system, further, validates the health and the performance parameters by simulating the computer simulated instances in a virtual environment. The system determines a behavior status, a performance status and a health status of the electric vehicle. Thereafter, the system determines abnormality associated with the electric vehicle, followed by determining action for rectifying the abnormality. Consequently, the system controls an operation by performing the determined action at the electric vehicle.

20 Claims, 12 Drawing Sheets

(51) Int. Cl.

| | |
|---|---|
| ***B60L 58/12*** | (2019.01) |
| ***B60L 58/16*** | (2019.01) |
| ***B60W 30/182*** | (2020.01) |
| ***B60W 50/00*** | (2006.01) |
| ***B60W 60/00*** | (2020.01) |
| ***G07C 5/04*** | (2006.01) |

(52) U.S. Cl.

CPC ........... *B60L 58/16* (2019.02); *B60W 30/182* (2013.01); *B60W 50/0097* (2013.01); *B60W 60/0015* (2020.02); *B60W 60/0023* (2020.02); *G07C 5/04* (2013.01); *B60L 2240/12* (2013.01); *B60L 2240/54* (2013.01); *B60L 2240/642* (2013.01); *B60L 2240/66* (2013.01); *B60L 2240/68* (2013.01); *B60L 2260/20* (2013.01); *B60L 2260/50* (2013.01); *B60W 2050/0012* (2013.01); *B60W 2050/0031* (2013.01); *B60W 2510/244* (2013.01); *B60W 2520/10* (2013.01); *B60W 2530/10* (2013.01); *B60W 2530/16* (2013.01); *B60W 2540/30* (2013.01); *B60W 2552/15* (2020.02); *B60W 2552/40* (2020.02); *B60W 2554/406* (2020.02); *B60W 2555/20* (2020.02); *B60W 2710/20* (2013.01); *B60W 2720/10* (2013.01)

(58) Field of Classification Search

CPC ...... B60L 15/2045; B60L 58/12; B60L 58/15; G07C 5/04

See application file for complete search history.

SYSTEM AND METHOD FOR ELECTRIC VEHICLE OPERATIONAL OPTIMIZATION

CLAIM OF PRIORITY

This application claims priority under 35 USC § 119(e) to U.S. Provisional Application No. 63/568,572, filed on Mar. 22, 2024, the entire contents of which are hereby incorporated by reference in the entirety for all purposes.

TECHNICAL FIELD

Various examples described herein relate generally to electric vehicle operational optimization. Specifically, disclosed examples are directed to a system and a method for electric vehicle operational optimization using machine learning (ML) and deep learning models.

BACKGROUND

The transportation sector is a major contributor to growing challenges related to carbon emissions and oil resource limitations, as it produces a significant portion of greenhouse gases. To address these challenges, sustainable transportation is being promoted, with electric vehicles (EVs) emerging as a leading solution. The EVs are powered by rechargeable batteries which need periodic charging to provide the continuous mechanical needed to drive the vehicle. The EVs offer substantial environmental advantages, significantly reducing greenhouse gas emissions compared to conventional vehicles, even the most fuel-efficient ones. The EVs also minimize noise and vibration pollution. Recognizing aforementioned benefits and the urgency of climate action and energy security, adoption of EVs is encouraged worldwide. However, the increasing number of EVs necessitates a robust charging infrastructure to support the growing demand. Users need help determining optimal charging times, considering factors like electricity pricing and grid stability.

SUMMARY

Implementations of the present disclosure are generally directed to electric vehicle operational optimization. More particularly, implementations of the present disclosure are directed to systems and methods for electric vehicle operational optimization using machine learning (ML) and deep learning models.

In general, innovative aspects of the subject matter described herein provide a system and a method for electric vehicle operational optimization, performed by a system. The system may include a memory configured to store processor-executable instructions and a processor communicably coupled with the one or more memory and configured to execute the processor-executable instructions. The system may obtain input data associated with an electric vehicle from a plurality of data sources. The input data may include sensor data, battery data, vehicle health data, route data, and vehicle speed data, distance data, environmental data, and traffic data. The system may predict a set of health parameters and performance parameters associated with the electric vehicle based on the obtained input data using a trained machine learning model. Further, the system may generate computer simulated instances of the electric vehicle based on the predicted set of health parameters and the performance parameters. The computer simulated instances may emulate a behavior and a performance of the electric vehicle. The system may, further, validate the predicted set of health parameters and the performance parameters associated with the electric vehicle by simulating the generated computer simulated instances of the electric vehicle in a virtual environment using the trained machine learning model. Following, the system may determine a behavior status, a performance status and a health status of the electric vehicle based on results of the validation. Moreover, the system may determine one or more abnormality associated with the electric vehicle based on the determined behavior status, the performance status, and the health status of the electric vehicle. The system may determine one or more action to be performed for rectifying the determined one or more abnormality using the trained machine learning model. Herein, the one or more action may include recommendation on optimal operational parameters, battery charging stations, a travel route, and/or a drive mode of the electric vehicle. Consequently, the system may control an operation of the electric vehicle by performing the determined one or more action at the electric vehicle.

The present disclosure further describes a method for implementing by the system provided herein. The present disclosure also describes non-transitory computer-readable medium (CRM) coupled to one or more processors and having instructions stored thereon which, when executed by the one or more processors, cause the one or more processors to perform operations in accordance with the method described herein.

It is appreciated that systems in accordance with the present disclosure can include any combination of the aspects and features described herein. That is, the system in accordance with the present disclosure are not limited to the combinations of aspects and features specifically described herein, but also include any combination of the provided aspects and features.

The details of one or more implementations of the present disclosure are set forth in the accompanying drawings and the description below. Other features and advantages of the present disclosure will be apparent from the description and drawings, and from the claims.

BRIEF DESCRIPTION OF THE DRAWINGS

Various examples in accordance with the present disclosure will be described with reference to the drawings, in which.

Like reference numbers and designations in the various drawings indicate like elements.

DETAILED DESCRIPTION

Figure 1:
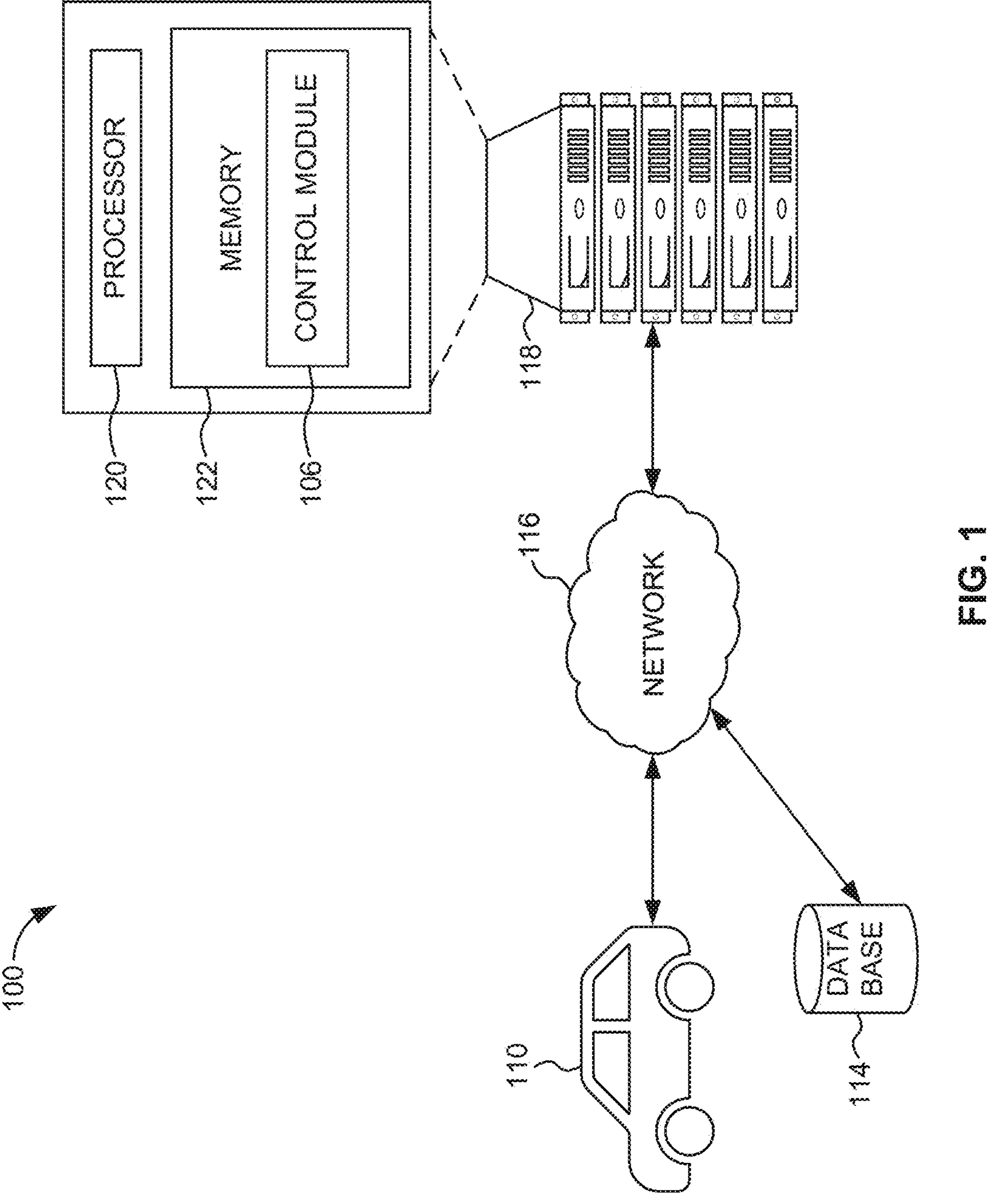
FIG. 1 illustrates an example environment used to execute implementations of the present disclosure.

In the following description, various examples will be illustrated by way of example and not by way of limitation in the figures of the accompanying drawings. References to various examples in this disclosure are not necessarily to the same example, and such references mean at least one. While specific implementations and other details are discussed, it is to be understood that this is done for illustrative purposes only. A person skilled in the relevant art will recognize that other components and configurations may be used without departing from the scope of the claimed subject matter.

Reference to any "example" (e.g., "for example", "an example of", "by way of example" or the like) are to be considered non-limiting examples regardless of whether expressly stated or not.

The terms used in this specification generally have their ordinary meanings in the art, within the context of the disclosure, and in the specific context where each term is used. Alternative language and synonyms may be used for any one or more of the terms discussed herein, and no special significance should be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only and is not intended to further limit the scope and meaning of the disclosure or of any exemplified term. Likewise, the disclosure is not limited to various examples given in this specification.

Without intent to limit the scope of the disclosure, examples of instruments, apparatus, methods, and their related results according to the examples of the present disclosure are given below. Note that titles or subtitles may be used in the examples for convenience of a reader, which in no way should limit the scope of the disclosure. Unless otherwise defined, technical and scientific terms used herein have the meaning as commonly understood by one of ordinary skill in the art to which this disclosure pertains. In the case of conflict, the present document, including definitions will control.

The term "comprising" when utilized means "including, but not necessarily limited to"; it specifically indicates open-ended inclusion or membership in the so-described combination, group, series and the like.

The term "a" means "one or more" unless the context clearly indicates a single element.

"First," "second," etc., are labels to distinguish components or blocks of otherwise similar names but does not imply any sequence or numerical limitation.

"And/or" for two possibilities means either or both of the stated possibilities ("A and/or B" covers A alone, B alone, or both A and B take together), and when present with three or more stated possibilities means any individual possibility alone, all possibilities taken together, or some combination of possibilities that is less than all of the possibilities. The language in the format "at least one of A . . . and N" where A through N are possibilities means "and/or" for the stated possibilities (e.g., at least one A, at least one N, at least one A and at least one N, etc.).

It should also be noted that in some alternative implementations, the functions/acts noted may occur out of the order noted in the figures. For example, two steps disclosed or shown in succession may in fact be executed substantially concurrently or may sometimes be executed in the reverse order, depending upon the functionality/acts involved.

Specific details are provided in the following description to provide a thorough understanding of examples. However, it will be understood by one of ordinary skill in the art that examples may be practiced without these specific details. For example, systems may be shown in block diagrams so as not to obscure the examples in unnecessary detail. In other instances, well-known processes, structures, and techniques may be shown without unnecessary detail in order to avoid obscuring details of the examples.

The specification and drawings are to be regarded in an illustrative rather than a restrictive sense. It will, however, be evident that various modifications and changes may be made thereunto without departing from the broader spirit and scope of the invention as set forth in the claims.

Although electric vehicles have been on the streets for years, the infrastructure supporting electric vehicles is still being built. While gasoline filling stations for conventional combustion vehicles are prevalent and typically easy to find, electric charging stations for electric vehicles are not guaranteed in all locations. Accordingly, it can be difficult to determine a route along which electric charging stations are available in locations where the electric vehicle needs to be charged. Additionally, it can be difficult for a driver to consistently drive the electric vehicle under conditions (e.g., vehicle speed and/or acceleration) that conserve charge the entire route. Further, battery health of an electric vehicle declines over the course of its life. As the battery health declines, battery parameters (e.g., capacity of charge, time to fully charge, distance per charge, etc.) of the battery change and needs for conserving charge and for planning routes correspondingly change. Thus, the needs of preserving battery life, an amount of charge the battery holds, and an amount of time needed to charge the battery all change over the course of the battery's life.

Artificial intelligence (AI) can improve electric vehicle manufacturing by using real-time data to optimize production parameters and increase accuracy Moreover, AI can create personalized in-car experiences by learning user/driver preferences and adapting to their needs, acting as an intelligent concierge.

In view of this, in the present disclosure, a system and a method for electric vehicle operational optimization, to overcome above mentioned drawbacks are described. The present disclosure discloses a digital twin technology based real-time electric vehicle optimization system. The proposed system determines to real-time optimal route-driven electric vehicles with smart charging strategies. The system includes monitoring a vehicle health that supports accurate battery state of charge (SoC), state of health (SoH)/remaining useful life (RUL) calculations of batteries. The aforementioned calculations are essential for electric vehicle range estimations to schedule vehicle routes and manage vehicle charging schedules in an energy-efficient manner. In the present disclosure, a digital twin model has been implemented to implement predictive analysis. Additionally, the digital twin model exercises the feasibility analysis, data aggregation, machine learning model level testing and functional verification. Furthermore, the proposed system analyzes and promotes the eco-driving recommendations that facilitate the reduction in an average energy consumption and extend a range of electric vehicles.

FIG. 1 depicts an example environment 100 that may be used to execute implementations of the present disclosure. In some examples, the example environment 100 may include a plurality of components capable of performing the disclosed computer implemented method of electric vehicle operational optimization. For example, the example environment 100 may include an electric vehicle 110, a computing system 118, a network 116, and a data base 114. The components of the example environment 100 may communicate with each other through network 116. For example, the computing system 118 may communicate with electric vehicle 110 (including sensors and/or controls of an electric vehicle) via network 116. In some examples, the network 116 includes a local area network (LAN), wide area network (WAN), the Internet, or a combination thereof, and connects web sites (e.g., web applications executing on the computing system 118), and the computing system 118. In some examples, the network 116 can be accessed over a wired and/or a wireless communications link. For example, mobile computing devices, such as smartphones can utilize a cellular network to access the network 116.

As shown in FIG. 1, a control module 106 may be hosted in computing system 118, which may have a memory 122 and a processor 120. The control module 106 may include subsystems directed toward obtaining/collecting information about battery health, battery charge, location of vehicle, speed of vehicle, etc. The control module 106 may include subsystems directed toward predicting conditions of the vehicle or optimal routes or optimal operation of the vehicle. The control module 106 may include subsystems directed toward controlling the electric vehicle based on predictions/recommendations generated by machine learning models based on desired destinations for the vehicle and conditions of the terrain, weather, and vehicle/vehicle battery.

In some examples, the processor 120 may include a single device processor located on a single device, or it may include multiple device processors located on one or more physical devices. Memory 122 may include any type of storage, which may be physically located on one physical device, or on multiple physical devices. In some cases, computing system 118 may comprise one or more servers that are used to host control module 106. Data base 114 may store data that may be retrieved by other components for system 118. While FIG. 1 shows a single database, it is understood that more databases/knowledge bases/repositories may be included in the system and method.

While FIG. 1 shows a single the computing system, it is understood that more the computing systems may be used. In some embodiments, the computing system 118 may include any appropriate type of computing device (e.g., smartphone, tablet, laptop computer, voice-enabled devices). The computing system 118 may be used for inputting, processing, and displaying information. For example, the computing system 118 may be used to remotely connect to at least one Original Equipment Manufacturers' (OEM) sensor of an electric vehicle and/or an Internet of Things platform connected to at least one OEM sensor of the electric vehicle 110. In another example, the computing system 118 may be used to collect electric vehicle 110 battery data of the electric vehicle from the at least one Original Equipment Manufacturers' (OEM) sensor of an electric vehicle and/or the Internet of Things platform, including parameters indicating battery state of health and battery state of charge. In another example, the computing system 118 may be used to upload the electric vehicle data to a cloud platform. In another example, the computing system 118 may be used to create a digital twin of the electric vehicle 110, wherein the digital twin includes the battery state of health and battery state of charge. In another example, the computing system 118 may be used to input the electric vehicle battery data from the cloud platform into a machine learning model to predict a travel route and travel speed and/or acceleration threshold for the electric vehicle based on a predetermined destination and the electric vehicle battery data. In another example, the computing system 118 may be used to communicate with controls of the electric vehicle to control the speed and/or acceleration of the electric vehicle to stay below the travel speed and/or acceleration threshold.

In some implementations, the system 118 may utilize a machine learning (ML) and deep learning (DL) techniques, to perform electric vehicle 110 operational optimization.

Various examples, depicting electric vehicle operational optimization, are described in detail in conjunctions with figures below.

Figure 2:
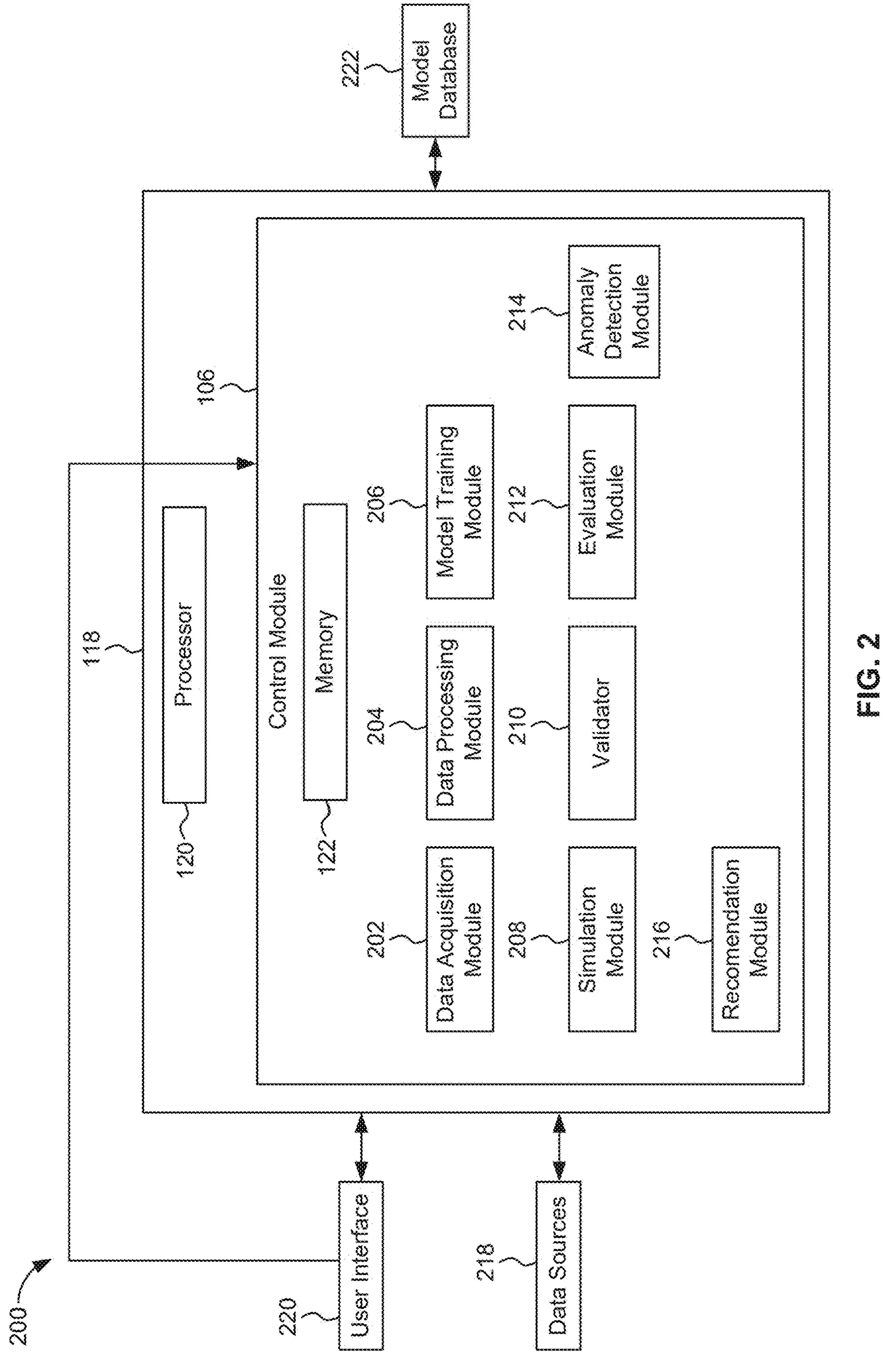
FIG. 2 illustrates an example architecture of a system for electric vehicle operational optimization, in accordance with implementations of the present disclosure.

FIG. 2 illustrates an example architecture 200 of the system 118 (or the computing system 118) for electric vehicle operational optimization, in accordance with implementations of the present disclosure. The system 118 may include one or more memory 122 storing processor-executable instructions and the processor 120. The system 118 may be communicably coupled to plurality of data sources 218. Moreover, the system 118 may include a user interface 220. The system 118 may include the processor 120 communicably coupled with the one or more memory 122 and configured to execute the processor-executable instructions. In some examples, the processor 120 may include, but not limited to, microprocessors, microcomputers, hardware processors, microcontrollers, digital signal processors, central processing units, state machines, logic circuits, Application Specific Integrated Circuits (ASICs), Field Programmable Gate Arrays (FPGAs), and/or any devices that manipulate data or signals based on operational instructions. Among other capabilities, the processor 120 may be programmed to cooperate with non-transitory computer-readable instructions stored in the one or more memory 122 (also referred to be as computer-readable medium) for performing operations according to the present disclosure. The one or more memory 122 may be non-transitory or non-volatile medium, such as a magnetic disk or solid-state non-volatile memory or volatile medium such as Random Access Memory (RAM), and/or the like.

In some examples, the one or more memory 122 may include a control module 106. The control module 106 may further include a data acquisition module 202, a data processing module 204, a model training module 206, a simulation module 208, a validator 210, an evaluation module 212, an anomaly detection module 214 and a recommendation module 216.

In some examples, the system 118 may obtain input data associated with the electric vehicle 110 from the plurality of data sources 218. The input data may include, but not limited to, sensor data, battery data, vehicle health data, route data, and vehicle speed data, distance data, environmental data, and traffic data. The plurality of data sources 218 may include in-vehicle or external sensors, external databases, hard-coded user data, broadcasted stream of data or data generated during the electric vehicle 110 usage and/or the internet of things (IoT) platform. The in-vehicle sensor may include original equipment manufacturers' (OEM) sensor. The OEM sensor may be integrated into the electric vehicle 110 by the manufacturer, for example, wheel speed sensors (providing data on individual wheel velocities), temperature sensors (monitoring battery, motor, and ambient temperatures), voltage and current sensors (measuring battery charge and discharge rates), accelerometer and gyroscope (tracking vehicle motion and orientation).

For example, the external sensors may include roadside traffic sensors which provide real time traffic flow data and weather stations which provide environmental data. The external databases may refer to data repositories hosted outside the electric vehicle 110, accessible via network connectivity. For example, the external databases may include cloud-based mapping services which provide route optimization and real-time traffic updates, public weather application programming interfaces (APIs) which provide detailed environmental information and charging station location and availability databases. The hard-coded user data refers to static configuration data or user preferences stored within the system 118, for example, user-defined preferred charging schedules, vehicle range estimation parameters and user profiles. The broadcasted stream of data may refer to real-time data transmitted over a network, such as cellular or dedicated short-range communication (DSRC). For example, broadcasted stream of data may include real-time traffic information broadcasted by traffic management systems and vehicle-to-everything (v2x) communication data. The data generated during the electric vehicle 110 usage may refer to data created as a result of the everyday operation of the electric vehicle 110, for example, trip logs, charging session logs and diagnostic trouble codes. The IoT refers to a platform which aggregates and manages data from connected devices. For example, smart home integration, where the electric vehicle's charging schedule may be synchronized with home energy consumption and smart city infrastructure providing real-time data on charging station availability and grid conditions.

Moreover, the sensor data refers to raw measurements from physical sensors (e.g., voltage, temperature, acceleration). The battery data may refer to information about battery's state of charge, health, and performance. The vehicle health data may refer to diagnostic information indicating a condition of various electric vehicles 110. The route data may refer to information about planned or actual routes, including waypoints and distance. The vehicle speed data may refer to real-time velocity of the electrical vehicle 110. The distance data may refer to an accumulated distance travelled, or distance to a destination. The environmental data may refer to information about surrounding environment, such as temperature, humidity, and weather conditions. The traffic data may refer to information about traffic flow, congestion, and incidents.

In an example implementation, the data acquisition module 202 may obtain said input data associated with the electric vehicle 110 from the plurality of data sources 218 and upload onto a cloud platform (for example, google cloud platform (GCP)) for further processing and analysis. The details of connectivity between the plurality of data sources 218 and cloud platform for data collection and ingestion is described in conjunction with FIG. 3. Further, the model training module 206 may predict a set of health parameters and performance parameters associated with the electric vehicle 110 based on the obtained input data using a trained machine learning model. The model training module 206 may communicate with a model database 222, said model database 222 may include the plurality of learning models. Specifically, the model database 224 may include one or more Large Language Models (LLMs) (also be referenced to as Machine learning (ML)) models, foundation models and/or the like). In an implementation, the LLMs may include pre-trained LLMs or generated LLMs. The pre-trained LLMs may be general-purpose ML models like large deep learning neural networks, which may be trained using a broad range of generalized and unlabeled training data to perform one or more tasks, such as, human computer interactions, automating process execution, process planning, generating step-by-step procedures for the process execution, performing data analysis, and/or the like. While implementations of the present disclosure are described in further detail herein with non-limiting reference to the LLMs, it is contemplated that implementations of the present disclosure may be realized using any appropriate foundation models or Machine Learning (ML) models.

The set of health parameters and performance parameters associated with the electric vehicle 110 may include, but not limited to, the SoC of the battery, the SoH of the electric vehicle 110, the RUL, and a range of the electric vehicle 110. The SoC of the battery may denote the capacity that is currently stored in the battery as compared to the full capacity. The SoC may be expressed in terms of percentage. For instance, the SoC of 100% means the battery is fully charged and the SoC of 0% means the battery is completely discharged. Additionally, the SoC may be directly proportional to a range the electric vehicle 110 may travel on a single charge. A higher SoC may imply more available energy, allowing for longer distances to be covered. Conversely, a lower SoC may restrict the range. Furthermore, the SoH may denote the electric vehicle 110 battery's overall condition and ability to deliver the designed capacity and power. In other words, the SoH may be defined as the ratio of the maximum battery charge to the rated capacity. The SoH may be expressed in terms of percentage. The SOH may provide insights of the battery's life expectancy and potential replacement dates. Low SOH batteries may be less able to store electronic charges at a given voltage, which reduces the availability.

Further, the remaining useable energy may denote the estimated amount of energy remaining in the battery that may be used for driving. The range may denote the predicted distance the electric vehicle 110 may travel on the remaining battery charge, considering factors like driving conditions and energy consumption patterns. Further details of predictions of the set of health parameters and the performance parameters associated with the electric vehicle 110 is explained in conjunction with FIG. 4.

Further, the simulation module 208 may generate computer simulated instances of the electric vehicle 110 based on the predicted set of health parameters and the performance parameters (by the model training module 206). The computer simulated instances may emulate a behavior and a performance of the electric vehicle. The simulation module 208 may represent the electric vehicle 110 and the associated components in a virtual environment to generate the computer simulated instances, said computer simulated instances of the electric vehicle 110 may include possible scenarios or operating condition. The behavior and the performance of the electric vehicle 110 may include simulating driving cycles with varying speeds, accelerations, and road gradients, simulating charging and discharging of the battery under different charging profiles and ambient temperatures and simulating the impact of environmental factors like temperature and wind on energy consumption and range. In other words, the simulation module 208 may facilitate virtual testing of the electric vehicle 110 under various conditions, without the need for physical prototypes or real-world testing. Specifically, the simulation module 208 may generate a digital twin model of the electric vehicle 110 based on the predicted set of health parameters and the performance parameters. Herein, the digital twin may include a set of parameters indicating the battery state of charge (SoC), the battery state of health (SoH), and the remaining useful life (RUL) of the electric vehicle 110. The digital twin model may refer to the virtual representation of the electric vehicle 110, including the key components and characteristics. The key components may include, for instance, battery model, vehicle dynamics model and energy consumption model. The battery model may simulate battery's electrochemical behavior, including SoC, SoH, and degradation. The vehicle dynamics model may capture the physical dynamics of the electric vehicle 110, including acceleration, braking, and handling. The energy consumption model may predict energy usage based on driving conditions, auxiliary loads, and environmental factors. The digital twin may be implemented using tools and frameworks, such as matrix laboratory (MATLAB)/Simulink, Modelica, or custom Python code. For instance, MATLAB's scripting capabilities may be used for data analysis, parameter estimation (fitting model parameters to experimental data), and simulating battery degradation over time. Additionally, Simulink's Simscape library may provide pre-built components for electrical and electrochemical modeling. Libraries like the Modelica Standard Library and specialized battery libraries may provide components for building detailed battery models. Modelica may simulate battery thermal behavior and long-term degradation. Python libraries like PyBaMM (Python Battery Mathematical Modelling) may facilitate battery simulations. In Python, Libraries like NumPy and SciPy may be used for numerical calculations and data processing. Machine learning libraries may be used to build data-driven energy consumption models based on driving patterns, environmental factors, and vehicle data. Moreover, the digital twin model may be parameterized using the predicted health and performance parameters (e.g., SoC, SoH, RUL) obtained from the model training module 206. The parameters may be used to initialize the state and characteristics of the digital twin. For example, the initial SoC of the battery model within the digital twin may be set based on the predicted SoC value. In an aspect, the digital twin model may be further enhanced by integrating real-time data from the actual electric vehicle 110. The real-time data may be used to update the digital twin model's state and parameters, ensuring that the digital twin model accurately reflect the current condition of the electric vehicle 110. The data integration may be implemented through various communication protocols and internet of things (IoT) platforms.

Furthermore, the simulation module 208 may configure the generated digital twin model of the electric vehicle 110 with the predicted set of health parameters and the performance parameters. To configure the digital twin model, the simulation module 208 may set the values of specific the predicted set of health parameters and the performance parameters within the model to match the predicted values. For example, the predicted SoH value may be used to adjust the parameters of the battery model that govern the degradation and capacity fade. Additionally, the digital twin model may be configured for specific scenarios or operating conditions, thereby simulating the electric vehicle's 110 behavior under different conditions. The specific scenarios or operating conditions may include setting environmental parameters (for example, temperature, wind speed, or the like), driving profiles (for example, speed, acceleration, or the like), or charging profiles (for example, charging power, duration, or the like) in the electric vehicle 110. Consequently, the simulation module 208 may generate the computer simulated instances of the electric vehicle 110 based on the configured digital twin model of the electric vehicle 110. The computer simulated instances may include multiple instances of the configured digital twin model, each computer simulated instance representing a potential scenario or operating condition. For example, the computer simulated instance may simulate the electric vehicle 110 driving on a highway at a constant speed. In another example, the computer simulated instance may simulate the electric vehicle 110 driving in city traffic with frequent stops and starts.

In addition, the simulation module 208 may produce outputs reflecting the simulated behavior of the electric vehicle's 110 computer simulated instance. Specifically, the outputs may include time-series data of SoC, SoH, RUL, energy consumption, and other relevant metrics. The outputs may be visualized (on the computing system 118) and analyzed to gain insights into the electric vehicle's 110 performance and potential issues. In an instance, real-time graphs, showcasing the results of said analysis, may be displayed.

Furthermore, the validator 210 may validate the predicted set of health parameters and the performance parameters associated with the electric vehicle 110 by simulating the generated computer simulated instances of the electric vehicle 110 in the virtual environment using the trained machine learning (ML) model. Specifically, the validator 210 may run simulations for each computer simulated instance, using the configured parameters and scenario definitions. For instance, the validator 210 may include simulating the battery's charge and discharge cycles, the electric vehicle's 110 movement and energy consumption, and the impact of environmental factors. Specifically, the validator 210 may simulate the generated computer simulated instances of the electric vehicle 110 in the virtual environment using the trained ML model. Herein, the virtual environment may be configured to replicate a real-world driving condition, said real-world driving conditions may include variations in terrain, traffic density, weather conditions, and road gradients. The validator 210 may place the generated computer simulated instances of the electric vehicle within the virtual environment. Thereafter, the validator 210 may utilize the trained ML model to predict the behavior of each computer simulated instance under the defined real-world conditions. The training of ML model may include inputting the ML model with data from the virtual environment (e.g., terrain, traffic, weather) and the current state of the electric vehicle's 110 instance (e.g., speed, battery level). The ML model's predictions may be, further, used to update the state of the electric vehicle's 110 instance within the simulation. For example, if the ML model predicts increased energy consumption due to uphill driving, the battery level of the simulated electric vehicle 110 instance may be adjusted accordingly.

Further, the validator 210 may generate simulation results for the electric vehicle 110 based on the simulation of generated computer simulated instances. Herein, the generated simulation results may correspond to the predicted set of health parameters and the performance parameters. Specifically, the validator 210 may execute the simulations of the generated computer-simulated instances of the electric vehicle 110 in the virtual environment. For instance, executing the simulations may include running the simulation module 208 with the configured parameters and scenarios, as explained previously. The simulation module 208 may calculate the state of the electric vehicle 110 over time, considering various factors like energy consumption, battery behavior, and vehicle dynamics. During the simulation, the validator 210 may collects data on various aspects of the electric vehicle's 110 behavior and performance from the in-vehicle or external sensors, external databases, hard-coded user data, broadcasted stream of data or data generated during the electric vehicle 110. The data may include time-series data of the battery's SoC, changes in the battery's SoH over time, RUL predictions based on simulated degradation, energy consumption profiles under different driving conditions and electric vehicle 110 performance metrics like speed, acceleration, and range. The collected data may be processed and analyzed by the validator 210 to generate simulation results. The simulation results may be presented or displayed on the user interface 220, in a meaningful format, such as, graphs and charts showing the evolution of SoC, SoH, and RUL over time, tables summarizing energy consumption and performance metrics and visualizations of the electric vehicle's 110 behavior in the virtual environment.

In further detail, the validator 210 may compare the generated simulated results with actual electric vehicle 110 operational data, and actual electric vehicle 110 performance data using statistical error metrics. The actual electric vehicle 110 operational data may refer to real-world data collected from the electric vehicle during the operation, for example, sensor data (e.g., battery voltage, current, temperature), global positioning system (GPS) data (e.g., speed, location, elevation), driving behavior data (e.g., acceleration, braking), environmental data (e.g., weather conditions), or the like. The actual electric vehicle 110 performance data may refer to data related to the overall performance of the electric vehicle 110, such as, range achieved on a single charge, energy consumption per unit distance, battery degradation rate and occurrence of any faults or anomalies. Moreover, the validator 210 may align the actual electric vehicle 110 operational data and actual electric vehicle 110 performance data with the simulated results. The alignment may include time synchronization between the actual data (that is, actual electric vehicle 110 operational data, and actual electric vehicle 110 performance data) and the simulation timestamps, Matching the actual driving conditions (e.g., terrain, traffic, weather) with the simulated environment and ensuring that the actual electric vehicle's 110 configuration (e.g., battery capacity, vehicle model) matches the parameters used in the simulation.

Moreover, the validator 210 may determine deviations in the predicted set of health parameters and the performance parameters based on the comparison. The validator 210 may utilize the statistical error metrics to quantify the difference between the simulation results and the actual data. The statistical error metrics may include, but not limited to, mean squared error (MSE), root mean squared error (RMSE), mean absolute error (MAE) and R-squared ($R^2$). The MSE may measures the average squared difference between the simulated and actual data values. The RMSE may refer to the square root of the MSE, providing an error value in the same units as the data. The MAE may measure the average absolute difference between the simulated and actual data values. The $R^2$ may represents the proportion of variance in the actual data that is explained by the simulation results. The statistical error metric may be selected based on the specific data being compared and the desired interpretation of the error.

The validator 210 may then compare the simulation results with the actual data using the selected statistical error metric and determine deviations in the predicted set of health parameters and the performance parameters based on the comparison, thereby, identifying any significant discrepancies or biases in the simulation. The comparison may include visualizing the simulated results and actual data together to identify trends and patterns. Further, the comparison may include calculating error statistics for different segments of the data (e.g., different driving conditions, different time periods). Additionally, the comparison may include performing statistical tests to determine if the differences between the simulated results and actual data are statistically significant. Furthermore, the validator 210 may generate a plurality of performance scores for the electric vehicle 110 based on the determined deviations. The performance score may facilitate quantitative assessment of the electric vehicle's 110 overall performance and may be used to identify areas for improvement. To generate the performance score, the validator 210 may define a set of relevant performance metrics, based on the specific goals and requirements of the electric vehicle's 110 operation. The set of relevant performance metrics may include, but not limited to, accuracy of SoC prediction, accuracy of SoH prediction, accuracy of RUL prediction, energy efficiency, range accuracy and safety. The accuracy of SoC prediction may be measured by the calculating deviation between predicted and actual SoC values. The accuracy of SoH prediction may be measured by the deviation between predicted and actual SoH values. The accuracy of RUL prediction may be measured by the deviation between predicted and actual RUL values. The energy efficiency may be measured by the deviation between predicted and actual energy consumption. The range accuracy may be measured by the deviation between predicted and actual range. The safety may be measured by the number of simulated safety violations or critical events. For each performance metric, a scoring function may be defined which may map the deviation to a numerical score, by the validator 210. In an instance, the scoring function may penalize larger deviations more heavily and/or reward smaller deviations or improvements over time. The output of the scoring function may be the performance score for each metric. For example, the SoH is required to be within a predicted range. If the actual SoH is within ±1% of the predicted value, the performance score may be 100 (that is, perfect). If the deviation is between 1% and 5%, the performance score may be 100−(deviation^2). (penalizing larger deviations more).

Following, the validator 210 may aggregate the individual performance scores for each metric to generate the performance score for the electric vehicle 110. The aggregation may be implemented by using techniques, such as, weighted averaging (assigning different weights to different metrics based on their importance), principal component analysis (PCA) (combining multiple metrics into a smaller set of principal components) and/or multi-criteria decision analysis (MCDA) (using decision rules to combine multiple metrics into an overall score). Consequently, the validator 210 may analyze generated performance scores to assess the overall performance of the electric vehicle 110. The analysis may include comparing the performance scores with predefined thresholds or benchmarks and tracking the performance scores over time to identify trends and improvements.

Moreover, the evaluation module 212 may determine a behavior status, a performance status and a health status of the electric vehicle 110 based on results of validation, from the validator 210. The behavior status may reflect behavior of the electric vehicle 110 in terms of the operational characteristics and responses to different driving conditions and scenarios. For example, aggressive acceleration and braking may be flagged as negative behavior status, by the evaluation module 212, indicating potential safety concerns and increased wear and tear on the electric vehicle 110. Smooth and consistent driving may be classified as a positive behavior status, by the evaluation module 212, suggesting efficient energy usage and reduced stress on the electric vehicle 110 components. Similarly, in another example, ability of the electric vehicle 110 to adapt to different road conditions and traffic situations may be considered as a positive behavior status. Further, the performance status may reflect the overall performance of the electric vehicle 110 based on various metrics and criteria. For example, high energy efficiency, measured in terms of miles per kilowatt-hour (kWh) or similar metrics, may contribute to a positive performance status. Similarly, achieving a long driving range on a single charge may be another positive indicator of performance status. In another example, fast charging capabilities may be considered the positive performance status. Moreover, the health status may reflect the overall health and condition of the electric vehicle 110, particularly focusing on the battery and other critical components. For example, a high SoH value, indicating good battery capacity and performance, may indicate a positive health status. In another example, the lack of any detected faults or anomalies in the electric vehicle 110 may indicate the positive health status.

Further, to determine the behavior status, the performance status and the health status of the electric vehicle 110, the evaluation module 212 may determine real-time vehicle properties, road properties, environmental factors, geographical factors and a driving pattern of a driver. Herein, the vehicle properties may include, but not limited to, a vehicle mass, a gravitational acceleration, an air density, a vehicle frontal area, a vehicle speed. The vehicle mass may refer to the actual weight of the electric vehicle 110, including passengers and cargo. The vehicle mass may be measured by onboard sensors and may change dynamically. The gravitational acceleration may refer to the acceleration an object experiences due to the force of gravity. Specifically, in order to analyze electric vehicle's 110 energy consumption, the gravitational forces involved on different terrains may be considered, as driving uphill requires more energy to counter the pull of gravity. In an aspect, the gravitational acceleration may be constant.

In another aspect, the evaluation module 212 may determine slight variations in gravitational acceleration based on location and elevation, obtained through GPS or mapping data. The air density may refer to the mass of air per unit volume. The air density may be impacted by factors like temperature, humidity, and altitude. The evaluation module 212 may obtain this data from onboard sensors, external weather APIs, or pre-loaded atmospheric models. The vehicle frontal area may refer to the cross-sectional area of the electric vehicle 110 facing the direction of motion. The vehicle frontal area may be a fixed value based on the electric vehicle's 110 design. In another aspect, the evaluation module 212 may adjust the vehicle frontal area based on factors like the use of roof racks or open windows. The vehicle speed may refer to current speed of the electric vehicle 110, measured by onboard sensors like wheel speed sensors or GPS. Furthermore, the road properties may include, but not limited to, a road slope angle, and a road rolling resistance coefficient. The road slope angle may refer to the angle of inclination or decline of the road surface. The road slope angle may be determined using onboard sensors like inclinometers or GPS data combined with elevation maps. The road rolling resistance coefficient may refer to the measurement of the force resisting the motion of the electric vehicle 110 due to friction between the tires and the road surface. The road rolling resistance coefficient may depend on factors like road type, tire condition, and temperature. The evaluation module 212 may use pre-loaded values of road rolling resistance for different road types or may estimate the road rolling resistance based on sensor data and driving conditions. Furthermore, the environmental factors may include, but not limited to, ambient temperature, wind speed and direction, and precipitation. The ambient temperature may refer to temperature of the surrounding environment, obtained from onboard sensors or external weather APIs. The wind speed and direction may impact aerodynamic drag and may be obtained from onboard sensors or external weather APIs. The precipitation may refer to presence of rain, snow, or other precipitation, which can affect road conditions and rolling resistance. The precipitation data may be obtained from onboard sensors or external weather APIs. Moreover, the geographical factors may include, but not limited to, elevation, road curvature and traffic density. The elevation may refer to altitude of the electric vehicle 110 above sea level, obtained from GPS or elevation maps. The road curvature may refer to the degree of curvature of the road, which can influence electric vehicle 110 dynamics and energy consumption. The road curvature may be obtained from GPS data and mapping information. The traffic density may refer to the number of vehicles on the road, which can affect driving patterns and energy consumption. The traffic density data may be obtained from onboard sensors, GPS data, or real-time traffic information services. In further detail, the driving pattern of the driver may include, but not limited to, acceleration and braking behavior, speed variations and, lane changes and turning. The acceleration and braking behavior may refer to the frequency and intensity of acceleration and braking actions, measured by onboard sensors like accelerometers and brake pressure sensors. The speed variations may refer to the fluctuations in electric vehicle 110 speed over time, indicating driving style (e.g., smooth vs. erratic). The lane changes and turning may refer to the frequency and abruptness of lane changes and turns, which can affect energy consumption and tire wear.

Further, the evaluation module 212 may determine a drive mode of the electric vehicle 110 based on the determined real-time vehicle properties, the road properties, the environmental factors, the geographical factors and the driving pattern of the driver. The drive mode may include one or more of a normal drive mode, an eco-drive mode and an aggressive drive mode. Specifically, the evaluation module 212 may preprocessed the determined real-time vehicle properties, road properties, environmental factors, geographical factors and the driving pattern of the driver. The preprocessing may include remove noise, outliers, and inconsistencies by utilizing techniques such as filtering, smoothing, and data fusion. The evaluation module 212 may extract relevant features from the preprocessed data to characterize the driving situation (or the drive mode). The relevant features may include, but not limited to, vehicle speed and acceleration, road slope and rolling resistance, environmental factors, geographical factors and driver behavior metrics. Moreover, the evaluation module 212 may utilize classification techniques to determine the drive mode based on the extracted features. In an instance, the classification techniques may be rule-based and/or machine learning based. The rule-based classification technique may include predefined rules and thresholds which may classify the drive mode based on specific feature values. For example, if the electric vehicle 110 speed consistently exceeds a certain pre-defined threshold and acceleration/braking patterns are aggressive, the drive mode may be classified as aggressive. The machine learning based classification technique may include machine learning model, such as a decision tree, support vector machine (SVM), or neural network, trained on historical driving data to learn the patterns associated with different drive modes. The trained model may then classify the current drive mode based on the extracted features. Based on the classification results, the evaluation module 212 may determine the appropriate drive mode to the electric vehicle 110. In further detail, the normal drive mode may represent typical driving conditions with moderate acceleration, speed, and energy consumption. The eco-drive mode may represent smooth acceleration, lower speeds, and optimized energy consumption for maximum range. The aggressive drive mode may represent rapid acceleration, high speeds, and potentially higher energy consumption. In an example, the normal drive mode may include speed range 60-80 kilometers per hour, the eco-drive mode may include speed range 40-60 kilometers per hour and the aggressive drive mode may include speed 80-120 kilometers per hour. The speed ranges associated with each mode may serve as a basis for determining the current drive mode, thus the driving pattern of the user, and therefore may influence the calculations. In an aspect, the drive mode may be dynamically updated based on the changing conditions and driver behavior. The evaluation module 212 may continuously monitors the real-time data and reclassifies the drive mode as required, thereby, allowing the system 118 to adapt to different driving situations and provide relevant feedback and recommendations to the driver.

Moreover, the evaluation module 212 may compute an inertial force value, a road slope force value, a road load friction value, and an aerodynamic drag force value based on the determined real-time vehicle properties, the road properties, the environmental factors, the geographical factors, and the driving pattern of the driver. Specifically, the inertial force value may refer to the apparent force acting on the electric vehicle 110 due to the mass and acceleration. In other words, the inertial force may refer to the resistance of the electric vehicle 110 to changes in the motion. The evaluation module 212 may compute the inertial force value by using the expression:

$$\text{Inertial Force} = \text{Vehicle Mass} \times \text{Acceleration}$$

The evaluation module 212 may utilize the real-time vehicle mass and acceleration data to compute inertial force value.

Further, the road slope force value may refer to a component of gravitational force acting on the electric vehicle 110 due to incline of the road. The evaluation module 212 may compute the inertial force value by using the expression:

$$\text{Road Slope Force} = \text{Vehicle Mass} \times \text{Gravitational Acceleration} \times \sin(\text{Road Slope Angle})$$

Furthermore, the road load friction value may refer to a coefficient of friction between the tires and the road surface, essentially representing the amount of grip the tires have on the road, which may directly impact factors like acceleration, braking, and handling. The higher value of road load friction value may indicate greater friction (better grip), and the lower value of road load friction value may indicate less friction (slippery road). The evaluation module 212 may compute the inertial force value by using the expression:

$$\text{Road Load Friction} = \text{Vehicle Mass} \times \text{Gravitational Acceleration} \times \text{Rolling Resistance Coefficient} \times \cos(\text{Road Slope Angle})$$

Further, the aerodynamic drag force value may refer to the force which opposes the electric vehicle's 110 motion due to air resistance. In other words, the aerodynamic drag force may refer to the force which may retards the motion of a vehicle. The aerodynamic drag force may be dependent on atmospheric conditions, the frontal area of the vehicle, and the velocity at which the vehicle is traveling relative to the wind. The evaluation module 212 may compute the inertial force value by using the expression:

$$\text{Aerodynamic Drag Force} = \text{air density} \times \text{road rolling resistance coefficient} \times \text{vehicle frontal area} \times \text{vehicle speed}$$

After that, the evaluation module 212 may determine a total force value, a total power consumed value, a total energy consumed value, a battery retention value, an estimated range, and a charging station distance value for the electric vehicle 110 based on the computed inertial force value, the road slope force value, the road load friction value, and the aerodynamic drag force value. The total force value may refer to the combined sum of all the forces (that is, inertial force, road slope force, road load friction and aerodynamic drag force) acting on the electric vehicle 110 while the electric vehicle 110 is in motion. Specifically, the total force value acting on the electric vehicle 110 may be determined by summing the previously computed forces, expressed as below:

$$\text{Total Force } (F_{total}) = \text{Inertial Force} + \text{Road Slope Force} + \text{Road Load Friction} + \text{Aerodynamic Drag Force}$$

The total force value may indicate the force needed for acceleration, essentially representing the total force required to propel the electric vehicle 110 forward at a given speed and condition. The total force value may be directly proportional to the power required to maintain a desired speed and overcome different road conditions.

Further, the total power consumed value may refer to the amount of electrical energy used by the electric vehicle over a specific distance. The total power consumed value may be measured in kilowatt-hours per 100 kilometers (kWh/100 km), which may indicate how much electricity the electric vehicle 110 may consume for every 100 kilometers driven. The evaluation module 212 may determine the total power consumed value by using the expression:

$$\text{Total Power Consumed } (P_{total}) = \text{Total Force } (F_{total}) \times \text{Vehicle Speed}$$

Additionally, the total power consumed value may represents the instantaneous power required to propel the electric vehicle 11*o* at the current speed against the total resistance.

Furthermore, the total energy consumed value may refer to the total energy consumed by the electric vehicle 110. The total energy consumed value may be calculated by integrating the total power consumed over time. The total energy consumed value may be determined by the evaluation module 212 by using the expression:

$$\text{Total Energy Consumed } (E_{total}) = \int P_{total}\, dt$$

The total energy consumed ($E_{total}$) value may represents the cumulative energy used by the electric vehicle 110 over a specific period.

Moreover, the battery retention value may refer to the remaining time the electric vehicle 110 may operate based on the current battery state of charge (SoC) and the rate of energy consumption. The battery retention value may be determined by the evaluation module 212 by using the expression:

$$\text{Battery Retention (hours)} = (\text{Battery } SoC)/(\text{Total Energy Consumed in one hour})$$

In an aspect, the battery retention value may be expressed as a percentage. Herein, 100% may indicate a completely new battery with full capacity, and a lower percentage may indicate a decrease in capacity over time.

Further, the estimated range may refer to the distance the electric vehicle 110 may travel before needing to be recharged. In other words, the estimated range may refer to remaining distance the electric vehicle 110 may cover on its current charge. The estimated range may be based on the battery capacity and the energy the electric vehicle 110 may consume. The estimated range may be calculated by multiplying the average driving speed by the battery retention value, expressed as:

$$\text{Estimated Range (km)} = \text{Average Driving Speed} \times \text{Battery Retention (hours)}$$

Further, the evaluation module 212 may determine the charging station distance value from the charge scheduling module, said charge scheduling module may utilize GPS data and mapping information to identify nearby charging stations and calculate the distance. By determining the charging station distance value, the system 118 may ensure drivers have access to charging points within a reasonable driving range. Specifically, the evaluation module 212 may utilizes GPS to pinpoint the precise location of the electric vehicle 110 in real-time, thereby, obtaining the latitude and longitude coordinates. A database of charging stations may be maintained, containing location information (latitude and longitude) for each station. The database may be stored onboard the electric vehicle 110 or may be cloud based. The database may also contain additional information about each station, such as connector types (e.g., CCS, CHAdeMO, Tesla Supercharger), charging speeds (e.g., Level 2, DC Fast Charging), availability (e.g., number of available chargers), pricing: (e.g., cost per kWh). Using the electric vehicle's 110 current location and the charging station locations from the database, the evaluation module 212 may calculates (for example, by using uses the Haversine formula) the distance to each charging station. The list of charging stations may be filtered based on pre-defined criteria. For example, the pre-defined criteria may be that only charging stations with connectors compatible with the electric vehicle 110 are to be considered. In another example, the pre-defined criteria may be that the driver may have preferences for certain charging speeds (e.g., DC Fast Charging).

After filtering, the evaluation module 212 may identify the closest charging station which meets the specified criteria and distance to said charging station may be then displayed to the driver. In an aspect, the charging station distance value may be dynamically updated as the electric vehicle 110 moves. The evaluation module 212 may continuously monitor the electric vehicle's 110 location and recalculate the distances to nearby charging stations, thereby, ensuring that the driver may access the most up-to-date information about nearby charging options.

Further, the evaluation module 212 may correlate the determined total force value, the total power consumed, the total energy consumed, the battery retention value, the estimated range, and the charging station distance value with the drive mode of the electric vehicle 110. Specifically, the evaluation module 212 may organize the determined data (that is, data corresponding to the determined total force value, the total power consumed, the total energy consumed, the battery retention value, the estimated range, and the charging station distance value) along with the data corresponding to the drive mode of the electric vehicle 110, in a structured format, such as a table or database, where each row may represent a snapshot in time and may include the values of said data along with the corresponding drive mode. The evaluation module 212 may utilize statistical techniques, such as, correlation coefficients, regression analysis, analysis of variance (ANOVA) and data visualization, to analyze the relationship between the drive mode and said determined data. The correlation coefficients may include calculating correlation coefficients (e.g., Pearson's correlation) to quantify the strength and direction of the linear relationship between the drive mode (represented numerically) and each determined data. The regression analysis may include building regression models to predict the determined data based on the drive mode, thereby identifying the affect the predicted values due to changes in driving behavior. The ANOVA may include comparing the means of the determined data across different drive modes to identify statistically significant differences. The data visualization may include creating scatter plots, box plots, or other visualizations to explore the relationships between the drive mode and the determined data.

Furthermore, the evaluation module 212 may identify patterns and trends in the determined data to establish correlation between the determined total force value, the total power consumed, the total energy consumed, the battery retention value, the estimated range, and the charging station distance value with the drive mode of the electric vehicle 110. For instance, higher total force, power consumption, and energy consumption, leading to lower battery retention and estimated range may be correlated with aggressive driving mode. In another instance, lower total force, power consumption, and energy consumption, resulting in higher battery retention and estimated range may be correlated with eco driving mode. Moreover, the evaluation module 212 may determine the behavior status, the performance status and the health status of the electric vehicle based on the correlation. Specifically, the identified patterns and trends may be interpreted to gain insights into the impact of driving behavior on the electric vehicle 110 performance.

In an aspect, the control module 106 may continuously obtain feedback on the determined behavior status, the performance status, and the health status of the electric vehicle 110 from the user 104 and the plurality of data sources 218. Specifically, the control module 106 may continuously comparing estimated battery parameters (SoC, SoH, Range) with actual measurements acquired from the control module 106, thereby determining ground truth. The control system's SoC measurements may be predicted to calculate the error between predicted and actual values, calibrating future SoC estimations. Further, estimated range may also be correlated to actual travel distance. Thus, the accuracy of the control module 106 may be enhanced over time, resulting in a higher degree of alignment between the determined behavior status, the performance status, and the health status of the electric vehicle 110 and real-world driving conditions.

Moreover, the system 118 may determine a modified set of hyperparameters associated with the trained machine learning model based on the continuously obtained feedback. For instance, data associated with the electric vehicle 110 may be gathered and categorized on different driving styles (e.g., "aggressive," "moderate," and "eco") and environmental conditions (e.g., road grade, temperature, wind speed, weather). Regression models may be used to measure the relationship between each of the different real-world driving styles. Moreover, machine learning model may be trained to generates modified set of hyperparameters. The system 118 may incorporate the set of hyperparameters by, for example, adding driving style and environmental condition and creating separate models for different driving/environmental categories.

In further detail, the system 118 may fine-tune the trained machine learning model with the modified set of hyperparameters. Herein, fine-tuning may refer to the process of utilizing trained machine learning model, followed by, further training machine learning model on new data or with adjusted hyperparameters.

Further, the anomaly detection module 214 may determine one or more abnormality associated with the electric vehicle 110 based on the determined behavior status, the performance status, and the health status of the electric vehicle 110. The one or more abnormality associated with the electric vehicle 110 may may indicate underlying issues or deviations from expected behavior. The one or more abnormality may include, but not limited to, behavior abnormalities, performance abnormalities and health abnormalities. For example, the behavior abnormalities may include erratic driving patterns, that is, sudden acceleration, harsh braking, or frequent lane changes that deviate significantly from the driver's usual behavior or the typical driving patterns for the current conditions. The erratic driving patterns may indicate driver distraction, impairment, or a potential electric vehicle 110 malfunction. In another example, performance abnormalities may include reduced range, that is, significant decrease in the electric vehicle's 110 driving range compared to the expected range under similar conditions. The reduced range may indicate battery degradation, inefficient driving, or a problem with the powertrain. In another example, the health abnormalities may include rapid battery degradation, that is, faster than expected decline in the battery's State of Health (SoH), indicating accelerated capacity fade or performance degradation. The rapid battery degradation may be caused by excessive charging/discharging cycles, high temperatures, or manufacturing defects.

Furthermore, to determine the one or more abnormality associated with the electric vehicle 110, the anomaly detection module 214 may compare the predicted set of health parameters and the performance parameters with a corresponding pre-stored threshold values. Specifically, the pre-stored threshold values may refer to the predetermined limits or ranges for each health and performance parameter. The pre-stored threshold values may represent the expected or acceptable values for normal operation of the electric vehicle 110. The pre-stored threshold values may be derived from the plurality of data sources 218, analyzing past data to determine typical ranges for each health and performance parameter. The pre-stored threshold values may be further defined by the manufacturer specifications and expert knowledge. In an example, the pre-stored threshold value corresponding to SoH may be set at 80%, meaning that a SoH value below the pre-stored threshold value may trigger an anomaly alert. The anomaly detection module may compare the predicted values of each health parameters and the performance parameters with the corresponding pre-stored threshold values. If the predicted value falls outside the defined pre-stored threshold range, the predicted value may be flagged as a potential anomaly.

Moreover, the anomaly detection module 214 may determine a deviation in the predicted set of health parameters and the performance parameters based on the comparison. The deviation may be determined by calculates the difference between the predicted value and the expected value for each health and the performance parameter. The deviation may be expressed in absolute terms or as a percentage of the expected value. In some examples, the anomaly detection module may implement statistical analysis to the deviations to identify significant patterns or trends. The statistical analysis may include, but not limited to, calculating the mean and standard deviation of the deviations. The statistical analysis may also include performing statistical tests to determine if the deviations are statistically significant. Additionally, the statistical analysis may include comparing the deviations to historical data or distributions to assess the unusualness.

In further detail, the anomaly detection module 214 may compute a confidence score for the predicted set of health parameters and the performance parameters based on the determined deviation. Herein, the confidence score may indicate a performance level and a health status level. The confidence score may be represented as a numerical value which may represents the level of confidence or trust in the predicted health and performance parameters of the electric vehicle 110. The confidence score may range from 0 to 1, where 0 indicates no confidence and 1 indicates complete confidence. A higher confidence score may indicate that the predicted health and performance parameters are accurate and reliable, while a lower confidence score may indicate uncertainty. The anomaly detection module 214 may analyzes the deviations between the predicted health and performance parameters values and the expected values or pre-stored thresholds for each health and performance parameter. Larger deviations generally indicate lower confidence, as the larger deviation may indicate discrepancy between the predicted health and performance parameters and expected values. Thereafter, the anomaly detection module 214 may define a confidence function to map the deviations to confidence scores. The confidence function may be defined by utilizing techniques such as, inverse relationship, exponential decay and piecewise function. The inverse relationship may imply that the confidence score may be inversely proportional to the deviation, meaning that larger deviations may result in lower confidence scores. The exponential decay may imply that the confidence score may decrease exponentially as the deviation increases, providing a steeper drop in confidence for larger deviations. The piecewise function may imply that different confidence levels may be assigned based on predefined deviation ranges, allowing for more fine-grained control over the confidence score. In addition, the anomaly detection module 214 may assign different weights to different health and performance parameters based on the relevance to the overall health and performance of the electric vehicle 110. For example, deviations in critical parameters like battery SoH or estimated range may be given higher weights, as the SoH or estimated range may have a greater impact on the electric vehicle's 110 functionality.

Furthermore, the anomaly detection module 214 may aggregate confidence scores for individual parameters of predicted health and performance parameters to compute the overall confidence score for the predicted set of health and performance parameters. The aggregation may be implemented using various techniques, such as weighted averaging or a machine learning model which may consider the interdependencies between different predicted health and performance parameters. The confidence score may be used to indicate the performance level of the electric vehicle 110. A higher confidence score may indicate that the electric vehicle 110 is performing as expected, while a lower confidence score may indicate potential performance issues in the electric vehicle 110. The confidence score may also reflect the health status of the electric vehicle 110. The higher confidence score may indicate good health, while the lower confidence score may indicate potential health concerns in the electric vehicle 110. Consequently, the anomaly detection module 214 may identify the one or more abnormality associated with the electric vehicle 110 based on the computed confidence score. In essence, by computing and utilizing confidence scores, the anomaly detection module 214 may assess the electric vehicle's 110 condition, enabling informed decision-making regarding maintenance, operation, and potential interventions.

Moreover, the recommendation module 216 determine one or more actions to be performed for rectifying the determined one or more abnormality using the trained machine learning (ML) model. The one or more actions may include one or more recommendations on optimal operational parameters, battery charging stations, a travel route, and the drive mode of the electric vehicle 110. Specifically, the recommendation module 216 may receive information about the detected one or more abnormalities from the anomaly detection module 214. The information may include, but not limited to, type of abnormality (for example, battery degradation, inefficient driving, sensor malfunction), severity of abnormality (for example, minor, moderate, critical), specific parameters involved (for example, low SoH, high energy consumption, unusual tire pressure) and contextual information (for example, current driving conditions, location, weather). Further, the ML model may include a plurality of machine learning models. The plurality of machine learning model may include, but not limited to, a feedforward neural network (FFNN), a gradient boosting regression (GBR), and a long short-term memory (LSTM) network. The plurality of machine learning models may be trained on dataset including real-time battery data associated with the electric vehicle 110. The plurality of machine learning models may utilize the trained knowledge and reasoning capabilities to recommend contextually appropriate one or more action to be performed for rectifying the determined one or more abnormality. Further details of determining the one or more action to be performed for rectifying the determined one or more abnormality using the ML model is described in conjunction with FIG. 5.

Further, the control module 106 may control the operation of the electric vehicle 110 by performing the determined one or more actions at the electric vehicle 110. The control module 106 may self-drive the electric vehicle 110 in an? autonomous mode based on the behavior status, the performance status, and the health status of the electric vehicle 110. Herein, the autonomous mode may include controlling a vehicle speed, a vehicle steering, and/or an operation of the electric vehicle 110. In autonomous mode, the control module 106 may take over the functions normally performed by the driver. The control module 106 may receive actions or recommendations from the recommendation module 216 to rectify abnormalities or optimize performance. The control module 106 may then translates the actions into commands which may transmit to the appropriate actuators in the electric vehicle 110. For example, the control module 106 may receive an action "adjust regenerative braking". The control module 106 may transmit signals to the motor controllers of the electric vehicle 110 to increase or decrease the regenerative braking force.

In further detail, the control module 106 may transmit one or more control signals to the electric vehicle 110 to adjust the operational parameter based on a predicted route and energy consumption optimization strategy. The operational parameter may include a speed, an acceleration, and/or a regenerative braking. Specifically, the control module 106 may receive the information of predicted route and energy consumption optimization strategy from the recommendation module 216, followed by processing said information. The non-limiting examples of adjustment of operational parameter may include speed adjustment, acceleration adjustment, regenerative braking adjustment. For instance, to adjust speed, the control module 106 may sends signals to the motor controller to adjust the motor torque. Specifically, the optimization strategy may determine the desired speed profile along the route. The control module 106 may calculates the difference between the desired speed and the actual electric vehicle 110 speed. If the electric vehicle 110 needs to be accelerated, the motor controller may increase the motor torque. If the electric vehicle 110 needs to decelerate, the motor controller may decrease the motor torque or applies braking force. Additionally, closed-loop control systems (like PID controllers) may be used to minimize the speed error and maintain the desired speed. In another instance, the optimization strategy may determine the optimal acceleration profile (rate of change of speed) along the route. To increase acceleration, the motor controller rapidly increases torque. To decrease acceleration (or decelerate), the motor controller may reduce torque or apply braking. In another instance, for regenerative braking adjustment, the control module 106 may control the motor to act as a generator, converting kinetic energy into electrical energy and slowing down the vehicle. Specifically, the control module 106 may determine the braking demand based on the optimization strategy. The control module 106 may determine the braking force required from the regenerative braking and from the friction brakes. The regenerative braking may be prioritized to recover energy. The motor controller may adjust the motor's operation to provide the desired regenerative braking force. Also, if additional braking force is required, the control module 106 may activate the friction brakes in a coordinated manner.

Moreover, the control module 106 may continuously receive the electric vehicle 110 behaviour data and the performance data from the electric vehicle 110. In an aspect, the control module 106 may receive said behaviour data and the performance data from the electric vehicle 110 through sensors, data acquisition system and communication network. The sensors may include a network of sensors strategically placed throughout the electric vehicle 110. The sensors may measure various physical quantities and convert them into electrical signals that the control module 106 may analyze. For example, wheel speed sensors may measure the rotational speed of each wheel, providing data on vehicle speed, wheel slip (important for traction control), and overall vehicle motion. In another example accelerometers may measure the electric vehicle's 110 acceleration in different directions (forward/backward, left/right, up/down), providing data on vehicle dynamics and driver behavior (e.g., aggressive acceleration/braking). The current and voltage sensors may measure the current and voltage of the battery and motor circuits, providing data on energy consumption, battery charge/discharge rate, and motor power. The electrical signals from the sensors may be processed by the control module 106 by using components, for example, signal conditioning circuits and analog-to-digital converters (ADCs). The signal conditioning circuits may amplify, filter, and convert the signals received from the sensors into a format that can be read by the processor 120. The ADCs may convert analog sensor signals (continuous values) into digital signals (discrete values) that can be processed by digital computers. The processed electrical signals from the sensors may be transmitted to the processor 120 via the communication network within the electric vehicle 110.

Moreover, the control module 106 may update the computer simulated instances (generated by the simulation module 208) of the electric vehicle 110 in real time based on the continuously received vehicle behaviour data and the performance data. Specifically, the control module 106 may synchronization or updating of the simulation module 208 with the real-time data. The simulation module 208 may include internal variables called state variables. The state variables may represent the current condition of the simulated electric vehicle 110 (e.g., simulated speed, simulated battery SoC, simulated motor temperature). The control module 106 may utilize the continuously received electric vehicle behavior and performance data to update the corresponding state variables in the simulation module 208. The simulation module 208 may, in turn, generate update the computer simulated instances. For example, if the electric vehicle 110 speed sensor reports that the electric vehicle's 110 speed has increased by 5 km/h, the control module 106 may updates the simulated vehicle speed in the simulation module 208 by the same amount. In another example, if the battery current sensor reports that the battery is discharging at a rate of 100 A, the control module 106 may update the simulated battery SoC in the simulation module 208 to reflect the discharge.

Further, the control module 106 may dynamically tune the trained machine learning (ML) model based on the updated computer simulated instances. Specifically, the control module 106 may compare the ML model's predictions with the corresponding values in the updated computer simulated instances. The difference between the ML model's predictions and updated computer simulated instances may represent the error. The ML model's parameters (e.g., weights in a neural network) may be adjusted to reduce the error, thereby making the ML model's predictions accurate, by utilizing techniques such as reinforcement learning.

Figure 3:
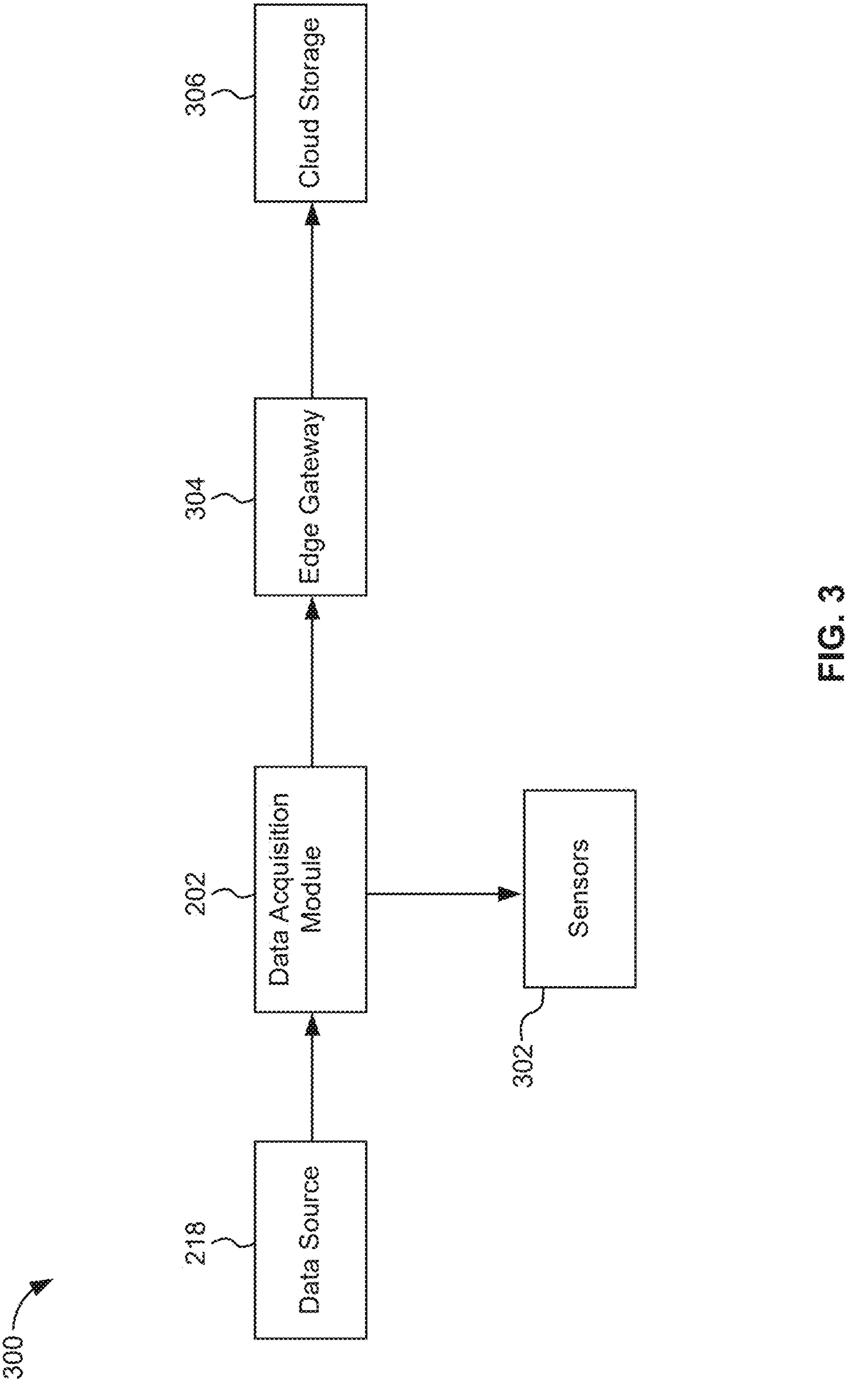
FIG. 3 illustrates an example architecture illustrating connectivity between data sources and cloud platform for data collection and ingestion into the system, in accordance with implementations of the present disclosure.

FIG. 3 illustrates an example architecture 300 illustrating the connectivity between the plurality of data sources 218 and cloud platform for data collection and ingestion into the system 118, in accordance with implementations of the present disclosure. In an aspect, the data acquisition module 202 may obtain input data associated with the electric vehicle 110 from include a plurality of sensors 302, said plurality of sensors 302 may be in-vehicle or external sensors. The plurality of sensors 302 may obtain the input data, including, but not limited to, sensor data, battery data, vehicle health data, route data, and vehicle speed data, distance data, environmental data, and traffic data. The input data from the plurality of sensors 302 may be transmitted using local edge protocols (for instance proprietary or industry-specific protocols) to an edge gateway 304. The edge gateway 304 may refer to a networking device that collect and analyze data at the edge to reduce latency and bandwidth requirements, thereby, optimizing processing of the input data. The edge gateway 304 may include sensor connectors which interface with the plurality of sensors 302, enabling input data ingestion. The edge gateway 304 may perform data collection, real-time processing, and temporary caching of the input data, thereby reducing latency and ensuring data availability in case of network disruptions.

Further, the edge gateway 304 may apply data normalization techniques to standardize the input data, ensuring consistency and compatibility for downstream processing. The data normalization may include scaling, unit conversion, and format transformation. Following Followed by, the edge gateway 304 may performs data integration, that is, combining data from the plurality of sensors 302 and to create a unified view of the electric vehicle's 110 battery state. Furthermore, the edge gateway 304 may transmits the processed data to a cloud storage 306 (for example, Google Cloud). Specifically, said processed data may be transmitted to the cloud storage 306 using streaming or batch data processing methods. Streaming may be used for real-time data, while batch processing may be used for historical or aggregated data. The transmitted data to the cloud storage may generate key performance indicators (KPIs) and dashboards, thereby providing insights into the electric vehicle's 110 battery's health, performance, and operational status. The non-limiting examples of the KPIs may include SoH trend (graph showing the SoH over time, indicating degradation) and cycle count (total number of charge/discharge cycles). The non-limiting examples of dashboards may include visualizations (such as line charts, gauges, and color-coded alerts) and insights (such as, detecting of abnormal degradation patterns, identifying potential thermal runaway risks, and predicting remaining battery lifespan)

Figure 4:
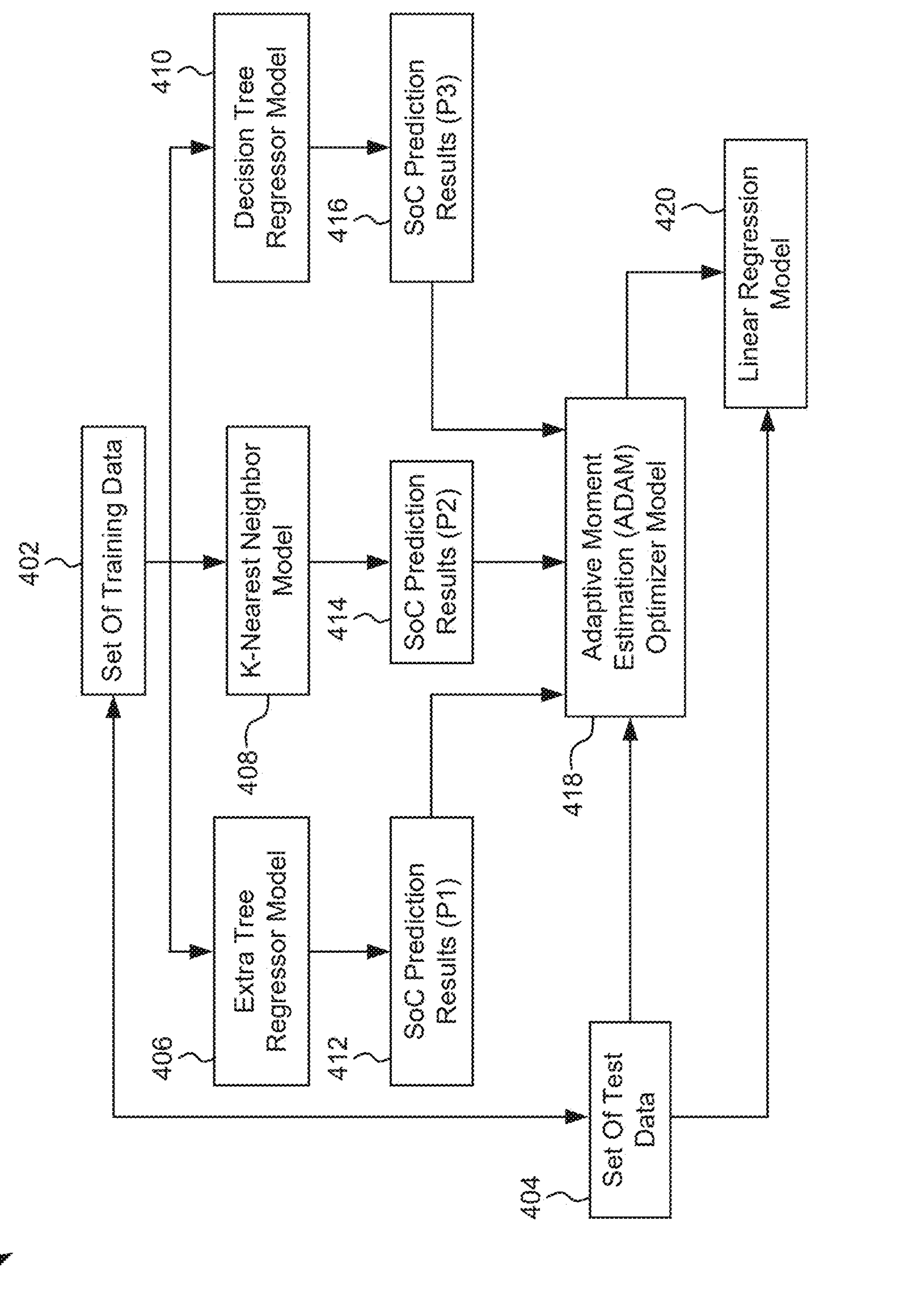
FIG. 4 illustrates a block diagram of a model training module for predicting of a set of health parameters and performance parameters associated with a electric vehicle, in accordance with implementations of the present disclosure.

FIG. 4 illustrates the model training module 206 for predicting of the set of health parameters and the performance parameters associated with the electric vehicle 110, in accordance with implementations of the present disclosure. The model training module 206 may obtain a set of training data 402 and a set of test data 404 associated with the electric vehicle 110 from the plurality of data sources 218. Specifically, the input data from the data acquisition module 202 may be split into the set of training data 402 and the set of test data 404, by the model training module 206. The set of training data 402 may include the data used to train the ML model, and the set of test data 404 may include the data which is new/unseen to the ML model and may be used for checking the ML model's performance on new data. The model training module 206 may determine how the ML model would perform on new/unseen data by splitting the input data into the set of training data 402 and the set of test data 404. For example, the input data may be split at an 80-20 or a 70-30 ratio of the set of training data 402 vs. the set of test data 404. The set of training data 402 may be added to the ML model to update the training phase parameters. After the training phase is completed, the set of test data 404 may be measured against how the ML model handles new observations.

In an aspect, the model training module 206 may train the ML model including, but not limited to, an extra tree regression model 406, a k-nearest neighbor model 408, and a decision tree regressor model 410, with the obtained set of training data 402. The extra tree regression model 406 may create multiple decision trees and averages the predictions of said multiple decision trees to make final prediction. Further, the k-nearest neighbor model 408 may utilize supervised learning techniques that classifies new data points by comparing them to the "k" closest data points (neighbors) in a labeled training dataset. The k-nearest neighbor model 408 may assign the new data point to the class which is most prevalent among the nearest neighbors. In other words, the k-nearest neighbor model 408 may utilize supervised learning techniques, meaning k-nearest neighbor model 408 may require labeled set of training data to make predictions on new data. To find the nearest neighbors, k-nearest neighbor model 408 may calculate the distance between the new data point and all points in the set of training data, for instance, by using Euclidean distance. The k-nearest neighbor model 408 may perform classification tasks (predicting a categorical label) and regression tasks (predicting a continuous value).

Furthermore, the decision tree regressor model 410 may predict numerical values using a tree-like structure. The decision tree regressor model 410 may split the set of training data based on features, where each may node represents a decision based on a specific feature, and the final prediction may be made at leaf nodes of the tree-like structure. The trained extra tree regression model 406, the k-nearest neighbor model 408, and the decision tree regressor model 410 may generate a first prediction result (P1) 412, a second prediction result (P2) 414, and a third prediction result (P3) 416 respectively. Following, model training module 206 may apply the first prediction result, the second prediction result, and the third prediction result, along with the set of test data 404 to an adaptive moment estimation (ADAM) optimizer model 418.

The model training module 206 may then determine a plurality of weights corresponding to each of the trained extra tree regression model 406, the trained k-nearest neighbor model 408, and the trained decision tree regressor model 410, based on an output of the ADAM optimizer model 418. Herein the ADAM optimizer model 418 may optimize the parameters (weights) of machine learning models which are trained using gradient descent. The gradient descent may refer to an iterative optimization technique that updates the model's parameters in the direction of the negative gradient of the loss function. Essentially, ADAM optimizer model 418 may determine the minimum of a function by repeatedly adjusting the variables based on the slope. The ADAM optimizer model 418 may include adjustable parameters (weights) which are updated iteratively to minimize a loss function. The model training module 206 may determine a plurality of weights corresponding to each of the trained extra tree regression model 406, the trained k-nearest neighbor model 408, and the trained decision tree regressor model 410, based on an output of the ADAM optimizer model 418. The ADAM optimizer model 418 may utilize optimization techniques such as, momentum and RMSprop. The momentum may accelerate the optimization process in the relevant direction by accumulating the moving average of past gradients. The RMSprop may adapts the learning rate for each parameter by dividing the learning rate by the square root of the moving average of squared past gradients.

The ADAM optimizer model 418 may be assigned initial values of weights for the extra tree regression model 406, the k-nearest neighbor model 408, and the decision tree regressor model 410. The initial values may be set randomly or to some predefined values (e.g., equal weights). Furthermore, the ADAM optimizer model 418 may calculate a weighted sum of the predictions from each model (that is, the extra tree regression model 406, the k-nearest neighbor model 408, and the decision tree regressor model 410) using the current weights. The ADAM optimizer model 418 may compute the difference (error) between this weighted sum and the actual target values (SoC) in the test data 404. The error may be determined by utilizing the metric such as, mean squared error (MSE). The ADAM optimizer model 418 may determine how much the error changes with respect to each weight, thereby generating the gradient of the error with respect to each weight. The ADAM optimizer model 418 may maintain a momentum term that accumulates past gradients. The momentum term may be updated by combining the current gradient with the previous momentum, using the momentum decay rate, thereby, accelerating the updates and convergence. The ADAM optimizer model 418 may further, maintain an adaptive learning rate for each weight. The adaptive learning rate may be updated based on the current gradient and the previous adaptive learning rate, using another decay rate. Thus, the learning rate for each weight individually may be adjusted, making the optimization process efficient. Moreover, the ADAM optimizer model 418 may combine the momentum term and the adaptive learning rate to calculate the update for each weight. The ADAM optimizer model 418 may further, subtract said update from the current weights to generate the new weights (or the plurality of weights). The ADAM optimizer model 418 may repeat the process of calculating the error, gradients, updating momentum and adaptive learning rates, and updating the weights for a certain number of iterations or until the error converges to a minimum. Once the optimization process is complete, the final plurality of weights may represent the optimal combination of the individual model predictions.

Furthermore, plurality of weights may be input to a linear regression model 420. The linear regression model 420 may determine an appropriate weight from among the determined plurality of weights corresponding to each of the trained extra tree regression model 406, the trained k-nearest neighbor model 408, and the trained decision tree regressor model 410. The linear regression model 420 may be trained on the appropriate weight from the ADAM optimizer model 418 and acts as the final aggregator, predicting the set of health parameters and the performance parameters associated with the electric vehicle 110 based on the determined appropriate weight. The linear regression model 420 may identify the coefficients (weights) for each of the plurality of weights that minimize the difference between the predicted health parameters and the performance parameters and the actual health parameters and the performance parameters. The coefficients may be identified using ordinary least squares (OLS) method, which may identify the coefficients that minimize the sum of squared errors between the predicted and actual health parameters and the performance parameters. The trained linear regression model 420 may generate a linear equation which combines the plurality of weights from the extra tree regression model 406, the k-nearest neighbor model 408, and the decision tree regressor model 410 to produce the health parameters and the performance parameters.

Figure 4A:
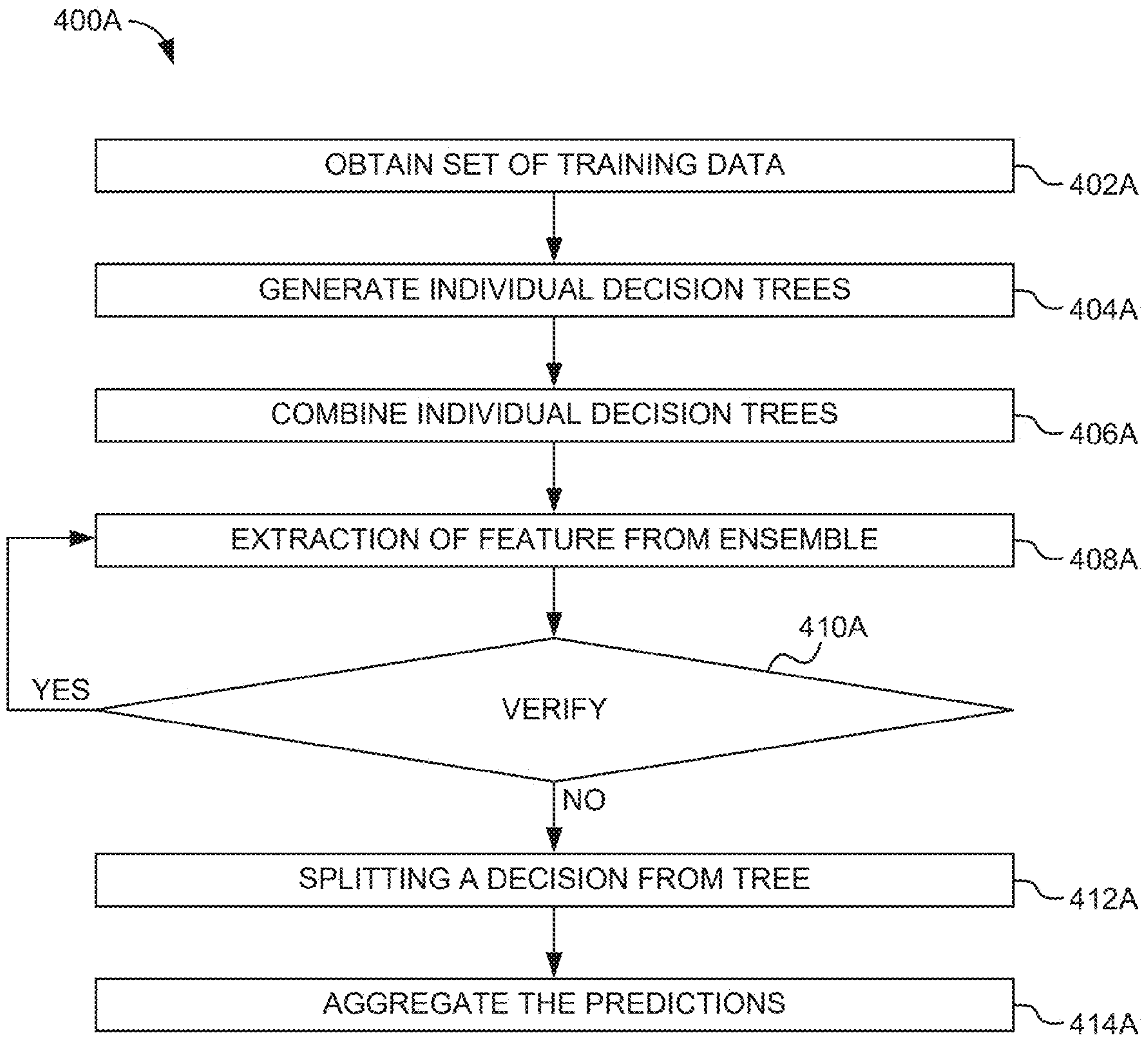
FIG. 4A illustrates a flow diagram of an example method implemented by the model training module to train an extra tree regressor model, in accordance with implementations of the present disclosure

FIG. 4A illustrates the flow diagram of an example method 400A implemented by the model training module 206 to train the extra tree regression model 406, in accordance with implementations of the present disclosure.

The method 400A may include obtaining 402A the set of training data 402 as input to the extra tree regression model 406. The set of training data 402 may include of features (attributes) and corresponding target values (labels or continuous values).

The method 400A may include generating 404A individual decision trees, followed by combining 406A the generated individual decision in an ensemble of trees.

Further, the extra tree regression model 406 may include extracting 408A a subset of features from the ensemble of trees. Specifically, the extra tree regression model 406 may randomly selects a subset of features (attributes) from the entire feature set in the set of the training data 402. For each selected feature, extra tree regression model 406 may generate several split points and select a random split point (threshold), among the random splits. The splitting process may be controlled by one or more parameters, k and $n_{min}$, where k may refer to the number of features which are randomly selected in the node, and $n_{min}$ parameter may refer to the minimum sample size expected to separate nodes. Furthermore, the strength of the selection of attributes and the average output noise strength may be determined by k and $n_{min}$ respectively. In an aspect, the extra tree regression model 406 may utilize below expression to measure the impurity of the split at each node in the decision tree:

$$G(x, \theta 1, \ldots, \theta r) = \frac{1}{R}\sum_{r=1}^{R} G(x, \theta r)$$

wherein,

G(x,θ1, . . . , θr) denotes function which calculates the impurity;

x represents the data points (features) at the current node in the decision tree;

R denotes the number of splits; and $\theta_r$ denotes the parameters defining the split.

Moreover, the method 400A may include verifying 410 if a stopping criterion is met. Specifically, the stopping criterion may include conditions like, but not limited to, minimum sample size, constant features and constant output. The minimum sample size may imply that if the number of samples in the node falls below the parameter $n_{min}$, the node may not be split further. The constant features may imply that if all features in a node have the same value, no split is possible. The constant output may imply that if all target values in a node are the same, no split is required.

Furthermore, in the method 400, if the stopping criterion is not met, the extra tree regression model 406 may include splitting 412A a decision from the tree. Specifically, the node of the tree may be split into two or more child nodes based on the selected feature and random split point.

In the method 400, if the stopping criterion is met, the extra tree regression model 406 may recursively repeats the process of feature selection (that is evaluating parameters k and $n_{min}$), random split point selection, and splitting until the stopping criteria are met for all nodes, resulting in a fully grown decision tree.

Consequently, the method 400 may include aggregating 414A the predictions from all trees using a voting mechanism (for classification) or averaging (for regression). For regression tasks, the final prediction may be obtained by averaging the predictions of all individual trees in the ensemble. For classification, the majority voting scheme may be utilized.

In aspect, below expressed logic may be implemented by the extra tree regression model 406:

```
Input: the local learning subset S corresponding to the node we want to
split
Output: a split [a < ac] or nothing
- If Stop split(S) is TRUE then return nothing.
- Otherwise select K attributes {a1,..., aK } among all non constant (in S)
candidate attributes;
- Draw K splits {s1,...,sK }, where si = Pick a random split(S, ai), ∀i =
1,...,
K;
- Return a split s* such that Score(s*, S) = maxi=1,...,K Score(si, S).
Pick a random split(S,a)
Inputs: a subset S and an attribute a
Output: a split
- Let aS
max and aS
min denote the maximal and minimal value of a in S;
- Draw a random cut-point ac uniformly in [aS
min, aS
max];
- Return the split [a < ac].
Stop split(S)
Input: a subset S
Output: a boolean
- If |S| < nmin, then return TRUE;
- If all attributes are constant in S, then return TRUE;
- If the output is constant in S, then return TRUE;
  Otherwise, return FALSE
```

Figure 4B:
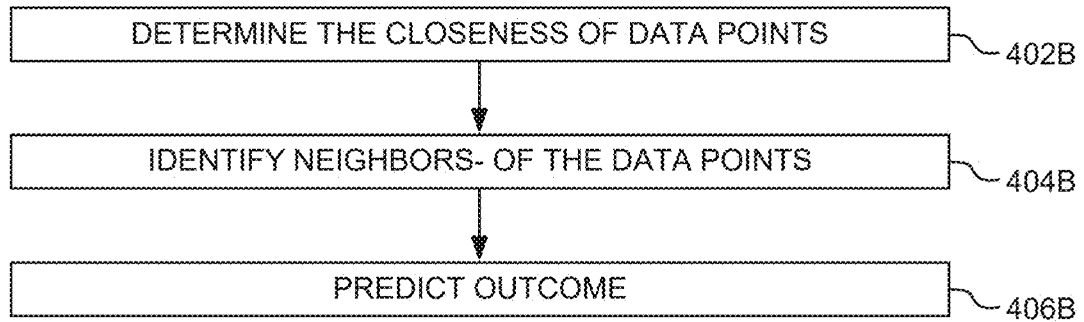
FIG. 4B illustrates a flow diagram of an example method implemented by the model training module to train a k-nearest neighbor model, in accordance with implementations of the present disclosure.

FIG. 4B illustrates the flow diagram of an example method 400B implemented by the model training module 206 to train the k-nearest neighbor model 408, in accordance with implementations of the present disclosure. For instance, the set of training data 402 may include n points, $(x_1, y_1)$, $(x_2, y_2)$, . . . , $(x_n, y_n)$, where each $x_i$ represents a vector of features and each $y_i$ represents the corresponding continuous outcome. The k-nearest neighbor model 408 may predict the outcome P for a new data point x based on the outcomes of the k nearest neighbors in the feature space.

The method 400B may include determining 402B the closeness of data points in the feature space, by calculating the distance metric. The distance metric may be calculated by utilizing techniques such as, euclidean distance, manhattan and/or minkowski. In other words, distance (d) between the datapoint x and $x_1, x_2, \ldots x_n$ may be calculated. In an example, the distance between the datapoint x and $x_1, x_2, \ldots x_n$ may be calculated may be calculated by utilizing the below expressed expression:

$$d(x, x_n) = \sqrt{(x-x_1)^2 + (x-x_2)^2 + \ldots + (x-x_n)^2}$$

The method 400B may include identifying 402B neighbors. Specifically, the k-nearest neighbor model 408 may, for the given data point x, find the k points in the set of training data 402 which are closest to x based on the distance metric. The k-nearest neighbor model 408 may rank the data points $x_1, x_2, \ldots x_n$ in ascending order based on their calculated distances from the data point x.

In aspect, below expressed logic may be implemented by the k-nearest neighbor model 408:

```
ALGORITHM Nearest-neighbor(D[1..n,1..n], s)
//Input: A n x n distance matrix D[1...n,1...n] and an index s of the
starting city.
//Output: A list Path of the vertices containing the tour obtained.
for i ← 1 to n do Visited[i] ← false
Initialize the list Path with s
Visited[s] ← true
Current ← s
for i ← 2 to n do
   Find the lowest element in row current and unmarked column j
   containing the element.
   Current ← j
   Visited[j] ← true
   Add j to the end of list Path
Add s to the end of list Path
return Path
```

Figure 4C:
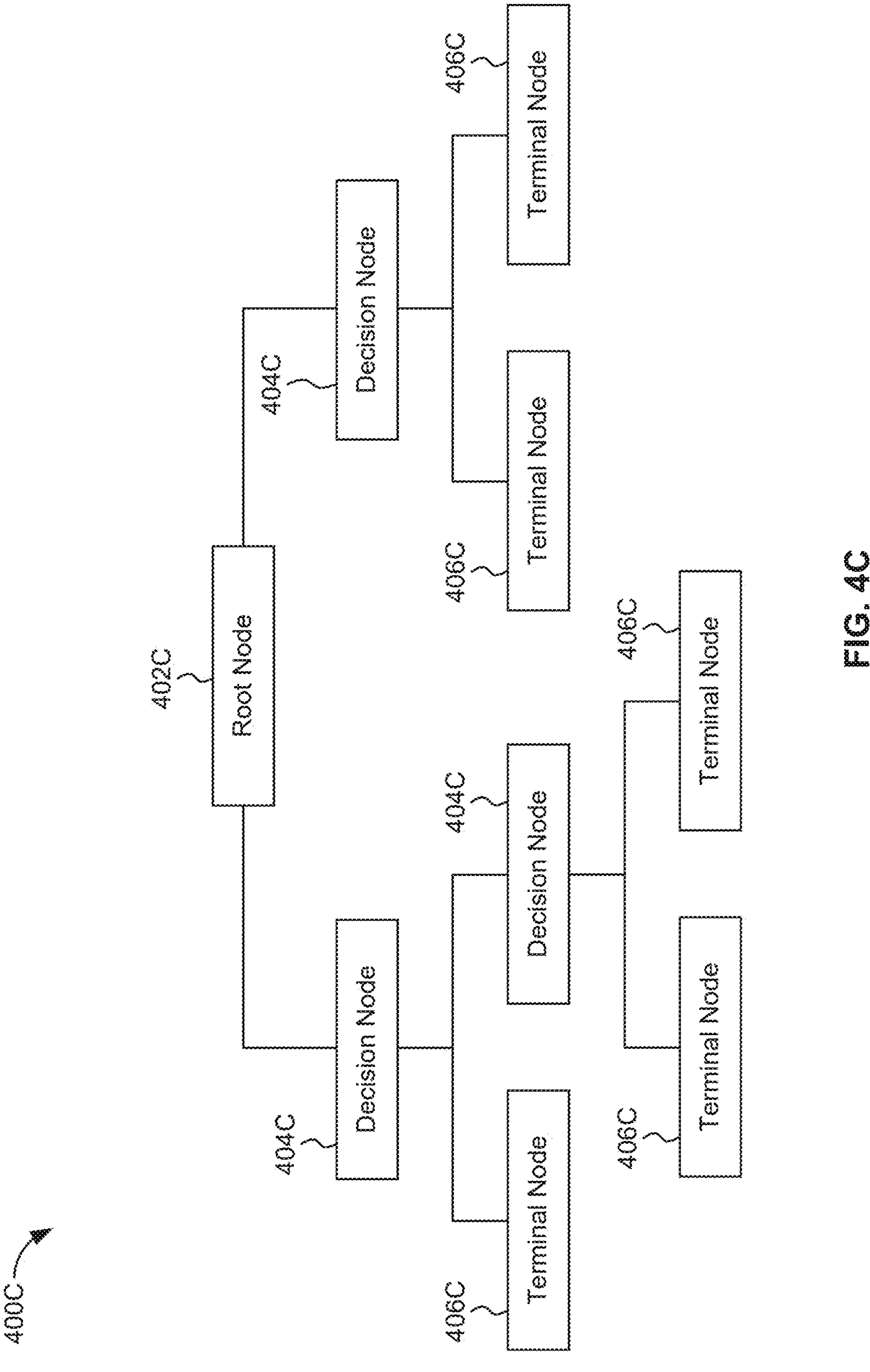
FIG. 4C illustrates a flow diagram of an example method implemented by a decision tree regressor model to generate a third prediction result, in accordance with implementations of the present disclosure.

FIG. 4C illustrates the flow diagram of an example method 400C implemented by the decision tree regressor model 410 to generate the third prediction result, in accordance with implementations of the present disclosure. The root node 402C may represent entire set of training data 402. The root node 402C may include all data points, along with their associated features and target labels. The decision tree regressor model 410 may analyzes the features of the data to select the most informative attribute to split on, by utilizing attribute selection measures like information gain or Gini impurity. Based on the selected feature, a decision criterion may be established. The data in the root node 402C may be partitioned into two or more subsets based on the decision criterion. Each subset may correspond to a different outcome of the test. The subsets resulting from the split may be represented by the decision nodes 404C. The decision nodes 404C may represent the application of the decision criterion. The connections between the root node 402C and the decision nodes 404C, as well as between subsequent nodes, may be called as branches. The branches may represent the flow of data based on the outcome of the decision. Moreover, each decision node 404C may become the root of a sub-tree. The splitting process may be recursively applied to each decision node 404C. That is, for each subset of data, the decision tree regressor model 410 may again selects the most informative attribute to split on and creates new decision nodes and branches. The recursive process may continue, progressively refining the partitioning of the data into smaller and homogeneous subsets. The recursive partitioning stops when a predefined stopping criterion is met. The stopping criterion may be, but not limited to, all data points in a node belong to the same class, there are no more features to split on, maximum tree depth is reached and minimum number of data points per node is met. The nodes where the splitting stops may refer to terminal nodes 406C. The terminal nodes 406C may represent the final prediction or classification. In classification, the terminal nodes 406C may be assigned a class label. In regression, the terminal nodes 406C may represent the predicted value (or the third prediction result).

Figure 5:
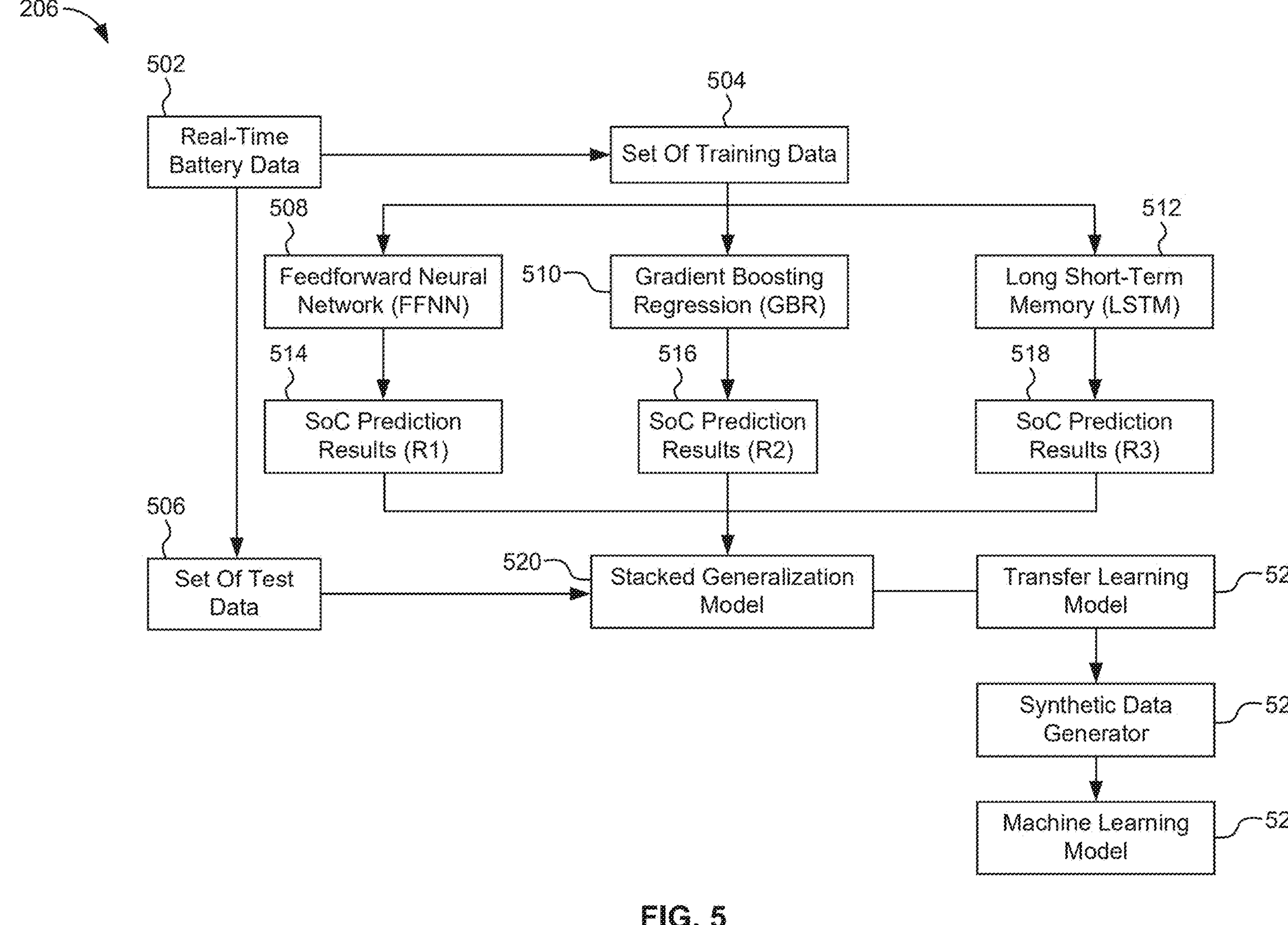
FIG. 5 may illustrate a block diagram of a recommendation module for determining one or more actions to be performed for rectifying one or more abnormality using machine learning model, in accordance with implementations of the present disclosure.

FIG. 5 may illustrate the recommendation module 216 for determining the one or more actions to be performed for rectifying the determined one or more abnormality using the ML model, in accordance with implementations of the present disclosure. The recommendation module 216 may receive a real-time battery data 502 associated with the electric vehicle 110 from the electric vehicle 110 via a communication network 116. Herein the real-time battery data may refer to the continuous monitoring of key parameters like voltage, current, temperature, and state of charge (SoC), thereby facilitating real-time assessment. The recommendation module 216 may generate a set of training data 504 and the set of test data 506. The set of training data 504 may include the data used to train the ML model, and the set of test data 404 may include the data which is new/unseen to the ML model and may be used for checking the ML model's performance on new data. The recommendation module 216 may process the generated set of training data 504 using a plurality of machine learning models. The machine learning model may include one or more of the feedforward neural network (FFNN) 508, the gradient boosting regression (GBR) 510, and the long short-term memory (LSTM) network 512. Each of the plurality of machine learning models, after processing the generated set of training data 504, may generate a respective state of charge (SoC) prediction results. In an aspect, the trained extra tree regression model 406, the trained k-nearest neighbor model 408, and the trained decision tree regressor model 410 may also be utilized to process the generated set of training data 504 and generate the respective state of charge (SoC) prediction results.

In further detail, the FFNN 508 may refer to the type of machine learning model that may learns and predict by processing the set of training data 504 forward through interconnected layers (input layer, hidden layer and output layer), from input to output, without loops or cycles, for tasks like battery management or power estimation. The FFNN 508 may include of layers of interconnected nodes (also called neurons or units). The set of training data 504 may flows in one direction, that is from the input layer, through hidden layers and to the output layer. In further detail, the input layer may receive the set of training data 504 as an input data. Each feature of the input data may correspond to the neuron in in the input layer. The hidden layer(s) may be present between the input layer and the output layer. The hidden layer(s) may perform non-linear transformations on the input data. Each neuron in the hidden layer(s) may calculate a weighted sum of the outputs from the previous layer. Further, an activation function may be applied to the weighted sum, said activation function may include Rectified Linear Unit (ReLU), sigmoid, and tanh. The activation function may implement non-linearity, enabling the FFNN 508 to learn complex relationships in the input data. Following, the output layer may generate SoC prediction result 514, based on the processed data from the previous layers, and the number of neurons in the output layer corresponds to the number of possible outcomes or classes. The number of neurons in the output layer may depend on the task. For example, for regression task, one neuron may be included. For binary classification, one neuron (e.g., sigmoid activation for probability) may be included. For multi-class classification, one neuron per class (e.g., softmax activation for probabilities) may be included. Moreover, the FENN 508 may utilize iterative process of forward propagation, back propagation, and optimization techniques to generate accurate SoC prediction result 514. The forward propagation technique may refer to process of transmitting the input data through the FENN 508, layer by layer, to compute the output (that is, SoC prediction result 514). The back propagation technique may be used during training to adjust the weights and biases of the FFNN 508. The back propagation technique may include calculating the error (loss) between the FFNN 508 output and the desired output. Additionally, back propagation technique may include propagating the calculated error backward through the FFNN 508, calculating the gradient of the loss with respect to each weight and bias. The optimization technique (e.g., stochastic gradient descent (SGD), Adam) may utilize the gradients to update the weights and biases to minimize the loss.

In an aspect, the FFNN 508 may utilize below expressions to compute SoC prediction result 514:

Input(x): Sampled $I_B(t_1)$, $V_B(t_1)$, $Temp(t_1)$, $Elevation(t_1)$, $Velocity(t_1)$ $$0 \le t_1 < \ldots < t_n$$

Output: $SoC(t_1)$, $Range(t_1)$ $$0 \le t_1 < \ldots < t_n$$

Model Parameters: $h_p$ & $h_a$ are model pre-activation and activation respectively, weighteg inputs, $w_i$, bias, $b_i$, AF is activation function and O is output activation function. $h_p(I_B(t_1)$, $V_B(t_1)$, $Temp(t_1)$, $Elevation(t_1)$, $$h_p\Big(I_B(t_1), V_B(t_1), \text{Temp}(t_1), \text{Elevation}(t_1), \text{Velocity}(t_1) = h_p(x) = \sum\nolimits_{i=1}^{n} x_i$$

$$\text{Predicted } SoC = \frac{1}{1 + e^{-(\sum_i w_i x_i + b)}}$$

$$\text{Value of } h_p \text{ at layer } i = h_{p(i)}(x) = w_i h_a(i-1)(x) + b_i$$

$$\text{Value of } h_a \text{ at layer } i = h_{a(i)}(x) = AF(h_{p(i)}(x))$$

$$\text{Value of activation at output layer} = \text{Predicted } SoC = O\left(h_{p_L}\right)$$

$$\text{Error function, } RMSE = \sqrt{\frac{\sum_{t=1}^{n} (\text{Predicted } SoC - \text{Actual } Soc)^2}{n}}$$

Moreover, the GBR 510 may refer to the type of machine learning model that utilize ensemble learning technique for regression tasks. The GBR 510 may sequentially train simple regression models (or weak prediction models), with each new model focusing on correcting the errors of the previous model. The GBR 510, consequently may generate an accurate prediction model for generating SoC prediction result 516. In other words, the GBR 510 may combines multiple weak prediction models (such as decision trees) to generate the strong and accurate prediction model. Specifically, the GBR 510 may firstly, initialize a simple model, such as the mean of the target variable. The GBR 510 may iteratively add new decision trees to the ensemble. Each new tree may be trained to predict the residuals or errors made by the current ensemble. The residuals may refer to the difference between the actual target values and the predictions of the current ensemble. Furthermore, decision trees may be created in a way that minimizes the loss function (e.g., mean squared error) on the residuals. The creation of decision trees may include identifying the splits in the set of training data 504 that best reduces the error. The predictions of each new tree may be added to the predictions of the previous ensemble along with a weight (often called a "learning rate" or "shrinkage"). The learning rate may control the contribution of each new tree and helps to prevent overfitting. The process of adding new trees may be implemented by using gradient descent technique. The gradient descent technique may calculate the gradient of the loss function with respect to the predictions of the ensemble. The new tree may be trained to predict the negative gradient, which may refer to the direction that will best reduce the loss. The final prediction of the GBR model, that is SoC prediction result 516, may the sum of the predictions of all the individual trees in the ensemble, each weighted by the learning rate.

Further, the LSTM network 512 may refer to the type of recurrent neural network (RNN) to process the sequential data and capture long-range dependencies. The LSTM network 512 may use the output as input, allowing LSTM network 512 to process sequences like time series, text, or audio. The LSTM network 512 may include LSTM cell including memory cells and gates, which may control the flow of information (in the set of training data 504), enabling the LSTM network 512 to retain and access information from previous time steps, over long sequence. The LSTM network 512 may process input sequences (of the set of training data 504) one element at a time and maintain a hidden state which may act as the memory cells, carrying information from previous time steps. The LSTM cell may include several gates to control the flow of information, including, forget gate, input gate and output gate. The forget gate may determines the information to be discarded from the LSTM cell. The input gate may determine the new information to be stored in the LSTM cell. The output gate may determine the information to be output from the LSTM cell. Each gate may be a neural network layer (such as sigmoid layer) that outputs values between 0 and 1. The value of 0 may mean completely block and the value of 1 may mean completely allow. The forget gate may receive the previous hidden state and the current input as input and, outputs the value between 0 and 1 for each number in the LSTM cell. The input gate may include the sigmoid layer which may decide the values to update and the tanh layer which may create a vector of new values. The sigmoid layer and the tanh layer may be combined to selectively update the LSTM cell. Furthermore, the output gate may receive the previous hidden state and the current input as input. The sigmoid layer may determine the parts of the LSTM cell to be output. The LSTM cell may be passed through the tanh layer and multiplied by the output of the sigmoid gate to produce the hidden state. The hidden state may be the output of the LSTM cell at each time step. The hidden state may be passed to the next LSTM cell in the sequence or used to make predictions. Additionally, the error may be propagated backward through the sequence, and the weights of the LSTM network 512 may be adjusted to minimize the loss. Consequently, the LSTM network 512 may generate SoC prediction result 518. In essence, the recommendation module 216 may generate the state of charge (SoC) prediction results, that is, the SoC prediction result 514, the SoC prediction result 516 and the SoC prediction result 516, based on an outcome of each of the plurality of machine learning models, including FFNN 508, GBR 510 and LSTM network 512, respectively.

In an aspect, the LSTM network 512 may utilize below expressions to compute SoC prediction result 516:

$$\text{Input Gate, Input}_t = \sigma\left(W_{Input} \cdot [h_{t-1}, C_{t(Actual)}, C_{useable}] + \text{Bias}_{Input}\right)$$

$$\tan_h = \tanh\left(W_{tan} \cdot [h_{t-1}, C_{t(Actual)}, C_{useable}] + \text{Bias}_{tan}\right)$$

$$\text{Updated memory cell, } mem_{cell(t)} = f_{cell(t)} * mem_{cell(t-1)} + \text{Input}_t * \tan_h$$

$$\text{Forget Gate, } f_{cell(t)} = \sigma\left(W_{f_{cell}} \cdot [h_{t-1}, C_{t(Actual)}, C_{useable}] + Bias_{f_{cell}}\right)$$

$$\text{Cell state} = f_{cell(t)} * mem_{cell(t-1)}$$

$$\text{Output Gate, Output}_t = \sigma\left(W_{Output} \cdot [h_{t-1}, C_{t(Actual)}, C_{useable}] + \text{Bias}_{Output}\right)$$

$$h(t) = Output_t * \tanh\left(mem_{cell(t)}\right)$$

$C_{t(Actual)}$, $C_{useable}$: Real time and rated battery capacity respectively $h_{t-1}$: Previous output state, W: weight matrix, $\sigma$: Activation function Moreover, the recommendation module 216 may generate a final SoC prediction result by combining the generated respective SoC prediction results (the SoC prediction result 514, the SoC prediction result 516) using a trained stacked generalization model 520. Specifically, the stacked generalization model 520 may combine respective SoC prediction results to trains a new model (referenced as meta-model) using the SoC prediction results. The meta-model may receive the outputs of the plurality of machine learning models as inputs. The meta-model may learn the optimal way to weight or combine the plurality of machine learning model predictions to produce the final SoC prediction result.

Additionally, the trained stacked generalization model 520 may be refined based on the set of test data 506, by applying the generated final SoC prediction result onto a transfer learning model 524. Specifically, the trained stacked generalization model 520 may be evaluated on the set of test data 506. The set of test data 506 may assess the trained stacked generalization model's 520 generalization performance, that is, how well the trained stacked generalization model 520 may performs on unseen data. The transfer learning model 524 may refer to the machine learning model which may utilize knowledge learned from a previous task or dataset to improve learning on a new, related task or dataset. The transfer learning model 524 may utilize knowledge from models trained on large datasets of battery data or related time-series data. Moreover, the transfer learning model 524 may utilize knowledge from previous versions of the stacked generalization model 520. The transfer learning model 524 may fine-tune the parameters of the stacked generalization model 520. The fine-tuning of the parameters may include adjusting the weights or parameters of the meta-model and/or the plurality of machine learning models based on the performance on the set of test data 506. The transfer learning model 524 may extract relevant features from the set of test data 506 and use them to adjust the stacked generalization model's 520 predictions. Also, the transfer learning model 524 may learn to adjust the weights assigned to the plurality of machine learning models and the stacked generalization model 520 based on the set of test data 506. By refining the stacked generalization model 520 using transfer learning model 524 and the set of test data 506, the recommendation module may improve generalization performance and accuracy on unseen data.

Further, a synthetic data generator 526 may generate synthetic datasets using the ML model (for example, generative adversarial networks (GANs), variational autoencoders (VAEs)). The synthetic datasets may simulate user conditions. The ML model may be trained on the output data of the transfer learning model 524. Once trained, the ML model may generate synthetic datasets which may simulate user conditions. The synthetic dataset generation process may be controlled to create specific types of driver conditions. For example, the ML model may be prompted to generate the synthetic dataset that simulates different driving styles, such as aggressive driving (high acceleration, frequent braking), eco-friendly driving (smooth acceleration, minimal braking), or distracted driving (erratic steering, inconsistent speed). The synthetic dataset may be generated for various road conditions, including highways, city streets, rural roads, uphill/downhill driving, and different levels of road friction. Also, the ML model may be used to simulate driving in rain, snow, fog, or other adverse weather conditions. The ML model may generate synthetic data for challenging scenarios which may be underrepresented in the real-world training data, such as emergency braking situations, sudden lane changes, or extreme weather events.

Furthermore, a machine learning model 528 may be trained by simulating the generated synthetic datasets in the virtual environment. Specifically, the virtual environment may be created using simulation software or a game engine. The virtual environment may replicate the real-world driving condition, said the real-world driving conditions may include variations in terrain, traffic density, weather conditions, and road gradients. The synthetic data generated by the synthetic data generator 526 may control or influence elements within the virtual environment. Further, simulation may be run within the virtual environment and the machine learning model 528 being trained may interacts with the simulated environment. During the simulation, data may be collected on the interaction between the machine learning model 528 and the virtual environment. The data may include actions taken by the machine learning model and resulting changes in the virtual environment. The collected data becomes the training data for the machine learning model 528. The model learns from its interactions within the virtual environment, improving its ability to perform the desired task. Training techniques like backpropagation (for neural networks) or reinforcement learning algorithms may be used.

Further, the recommendation module 216 may determine the one or more abnormality associated with the electric vehicle 110 based on an output of the trained machine learning model 528 and determine the action to be performed for rectifying the determined one or more abnormality at the electric vehicle 110 based on the one or more abnormality. The action may include driver assistance recommendations based on an analysis of traffic factors, environmental factors, and geographical factors using the trained machine learning model 528. Specifically, the recommendation module 216 uses the output of the trained machine learning model 528 to identify abnormalities associated with the electric vehicle 110. Once an abnormality is detected, the recommendation module 216 may uses the information about the abnormality to determine appropriate actions to rectify or mitigate the abnormality. The recommendation module 216 may utilize combination of logic, rules, and potentially further AI processing to determine the action. The action may include providing visual or auditory warnings about the detected abnormality. The action may further include automatically adjusting parameters like regenerative braking or power output to compensate for the abnormality. Also, the action may include recommending actions the driver may take to address the abnormality. Furthermore, in an example, driver assistance recommendations may include, but not limited to route optimization, speed recommendations, charging recommendations and driving mode suggestions. The route optimization may refer to recommending alternative routes to avoid traffic congestion or optimize energy consumption based on road conditions. The speed recommendations may refer to recommending the driver to adjust the speed based on traffic flow, weather conditions, or road slope to improve safety or efficiency. The charging recommendations may refer to recommending optimal charging times or locations based on traffic, energy consumption predictions, and charging station availability. The driving mode suggestions may refer to recommending specific driving mode (e.g., Eco mode) based on traffic and environmental conditions to maximize range or efficiency.

Figure 6:
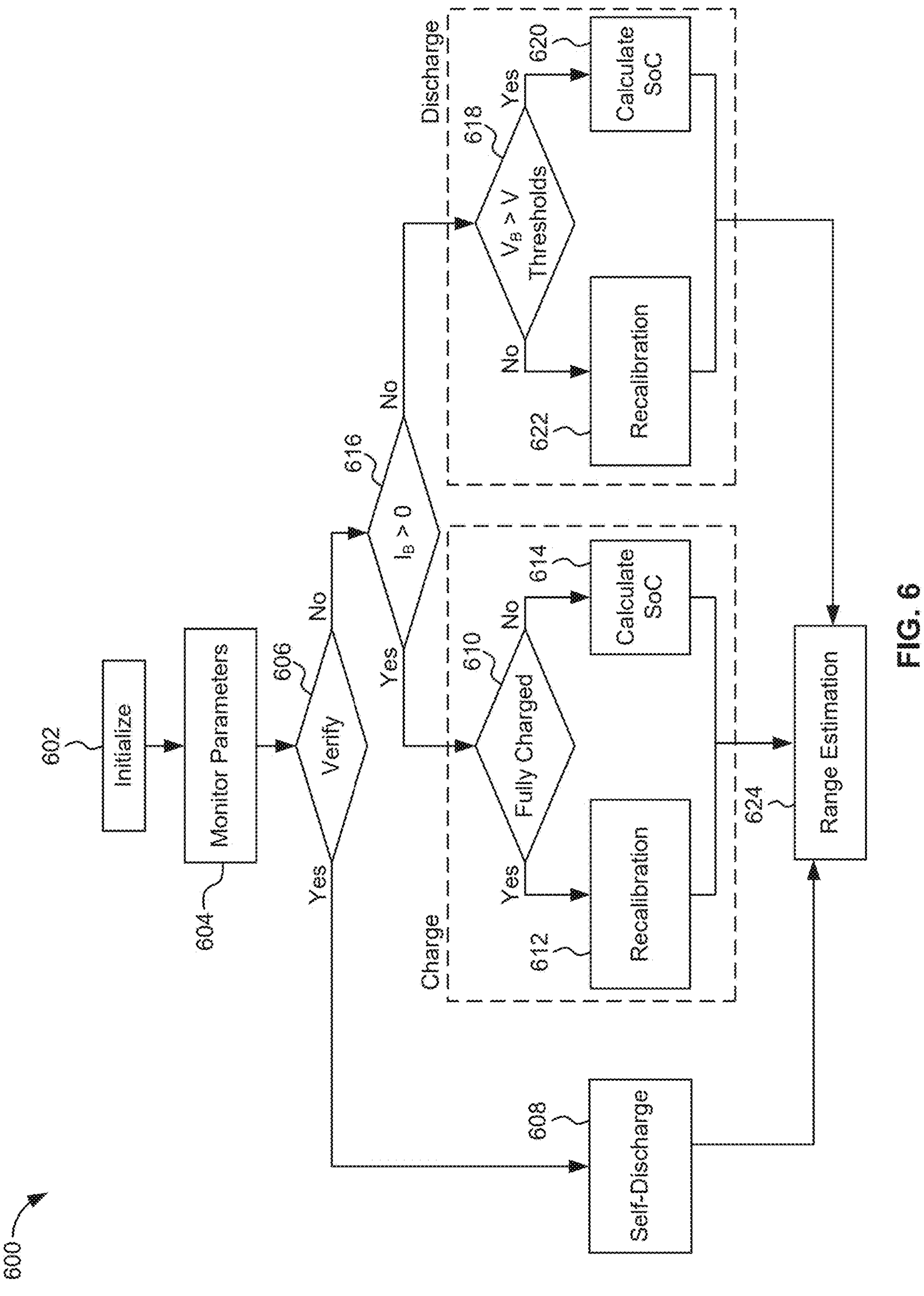
FIG. 6 illustrates the flow diagram of an example method implemented by the model training module to calculate a battery state of charge (SoC) and an electric vehicle range, in accordance with implementations of the present disclosure.

FIG. 6 illustrates the flow diagram of an example method 600 implemented by the model training module 206 to calculate SoC and electric vehicle 110 range, in accordance with implementations of the present disclosure.

The method 600 may include initializing 602 the model training module 206 with initial estimate of the battery's SoC. The initial value of SoC be based on previous readings or a default value.

The method 600 may include monitoring 604 parameters of electric vehicle 110, like, but not limited to, battery voltage (the voltage across the battery terminals), battery temperature (the temperature of the battery cells), elevation (the electric vehicle's 110 altitude, affecting energy consumption0, current (the current flowing into or out of the battery) and velocity (the electric vehicle's 110 speed).

The method 600 may further include verifying 606 if the battery current ($I_B$) is zero.

In the method 600, $I_B$ equal to zero (at 608) may indicate absence of no charging or self-discharging in the electric vehicle 110. Further, $I_B$ equal to zero may indicate self-discharge of the electric vehicle 110 and the if the electric vehicle 110 has been stored, the model training module 206 may measure and account for the charge lost during the period.

In the method 600, $I_B$ is not equal to zero may indicate that the battery is either charging or discharging. The model training module 206 may verify 616 if $I_B$ is greater or less than zero. $I_B$ is greater than zero may indicate that the battery is charging.

The method 600 may include verifying 610, if the battery has reached the full charge. If yes (612), the model training module 206 may performs a recalibration based on the battery's empty state to ensure accurate SOC readings. If no (614), the model training module 206 may calculates the SoC based on the charging current and other monitored parameters.

In the method 600, if $I_B$ is less than zero, indicating battery is discharging, the method 600 may further include verifying 618 if the battery voltage ($V_B$) is above a predefined threshold voltage (V). If yes (620), then the model training module 206 may calculate the SoC based on the discharging current and other monitored parameters. If no (622), the model training module 206 may performs a recalibration based on the battery's empty state.

The method 600 may include estimating 624 range of the electric vehicle 110 based on the calculated SoC and electric vehicle 110 efficiency. The electric vehicle 110 efficiency may be determined by the factors like driving mode, road conditions, and environmental factors.

In the described method 600, the model training module 206 may calculate SoC by using below expressed expressions:

Input: Sampled $I_B(t_1)$, $V_B(t_1)$, $Temp(t_1)$, $Elevation(t_1)$, $Velocity(t_1)$ $$0 \le t_1 < \ldots < t_n$$

Output: $SoC(t_1)$, $Range(t_1)$ $$0 \le t_1 < \ldots < t_n$$

$$SoC(0) = A * OCV - B$$

For j=1 to n $$SoC(t) = SoC(0) - \frac{\int_0^t \eta \cdot I_B(t)}{c_{useable}} dt$$

$$\eta\ \% = \frac{C_{DC}(\text{Discaharge capacity of Fully charged battery})}{C_{cc}(\text{Charge capacity in same cyale})} * 100$$

wherein, $I_B(t_1)$ denotes battery current at current time $(t_1)$;

$V_B(t_1)$ denotes battery voltage at current time $(t_1)$;

$Temp(t_1)$ denotes battery temperature at current time $(t_1)$;

$Elevation(t_1)$ denotes electric vehicle 110 elevation at current time $(t_1)$;

$Velocity(t_1)$ denotes electric vehicle 110 speed at current time $(t_1)$;

$SoC(t_1)$ denotes calculated SoC at current time $t_1$;

$Range(t_1)$ denotes electric vehicle 110 range at current time $(t_1)$;

$SoC(0)$ denotes initial SoC; and $\eta$ denotes efficiency of the electric vehicle 110.

Moreover, the model training module 206 may range of the electric vehicle 110 by using below expressions:

$$\text{Professed Range (Km), } Range_{Pr} = \frac{\text{Rated battery capacity (kWh)}}{\text{Vehicular Efficiency}}$$

$$\text{Driving Range (Km), } Range_{dr} = \frac{SoC(t)}{\text{Vehicular Efficiency}}$$

$$\text{Vehicular efficiency} = \frac{\text{Total distance covered (Km)}}{C_{useable}}$$

Figure 7:
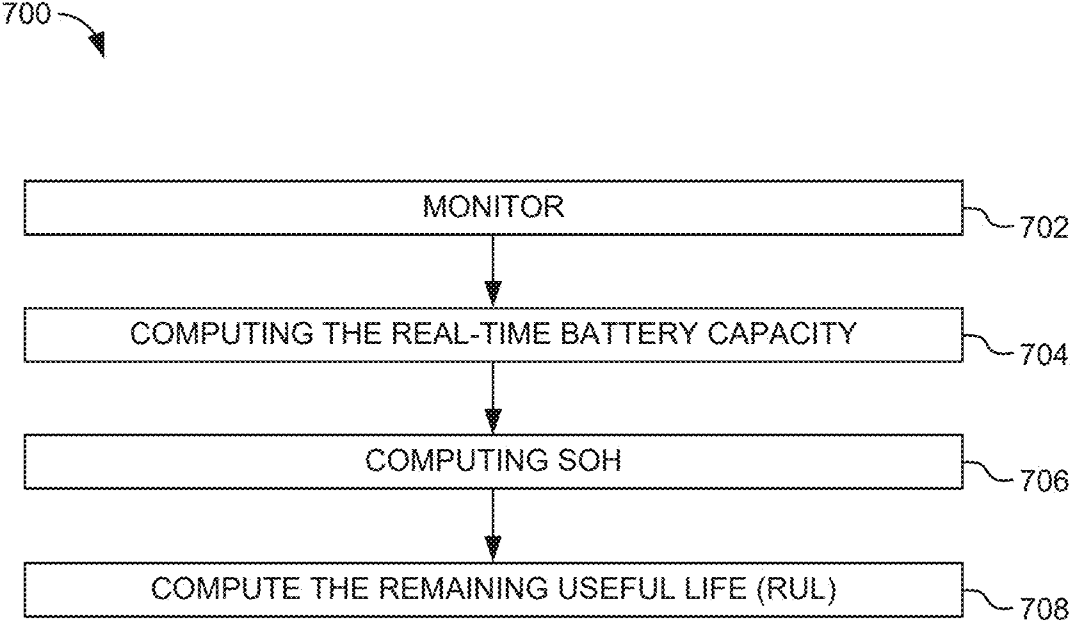
FIG. 7 illustrates the flow diagram of an example method 700 implemented by the model training module to calculate state of health (SoH) and an electric vehicle range, in accordance with implementations of the present disclosure

FIG. 7 illustrates the flow diagram of an example method 700 implemented by the model training module 206 to calculate SoH and electric vehicle 110 range, in accordance with implementations of the present disclosure.

The method 700 may include monitoring 702, battery voltage, current, temperature, energy, cycle index, capacity, time.

The method may include computing 704 the real-time battery capacity by multiplying the battery current by the elapsed time. Thus, an instantaneous estimate of the charge transferred may be determined.

The method 700 may further include computing 706 SoH is determined by dividing the real-time battery capacity (calculated in the previous step) by the rated capacity of the battery (the capacity when the battery was new). The resulting computed SoH may be expressed as a percentage. In an aspect, to SoH may be computed by using below expression:

$$SoH(\%) = \frac{C(t)_{Actual}}{C_{useable}} * 100$$

$$C(t)_{Actual} = I.T_D \text{ where } T_D \text{ specifies discharge duration}$$

wherein, $C_{t(Actual)}$, $C_{useable}$ denote real time and rated battery capacity respectively.

Figure 8:
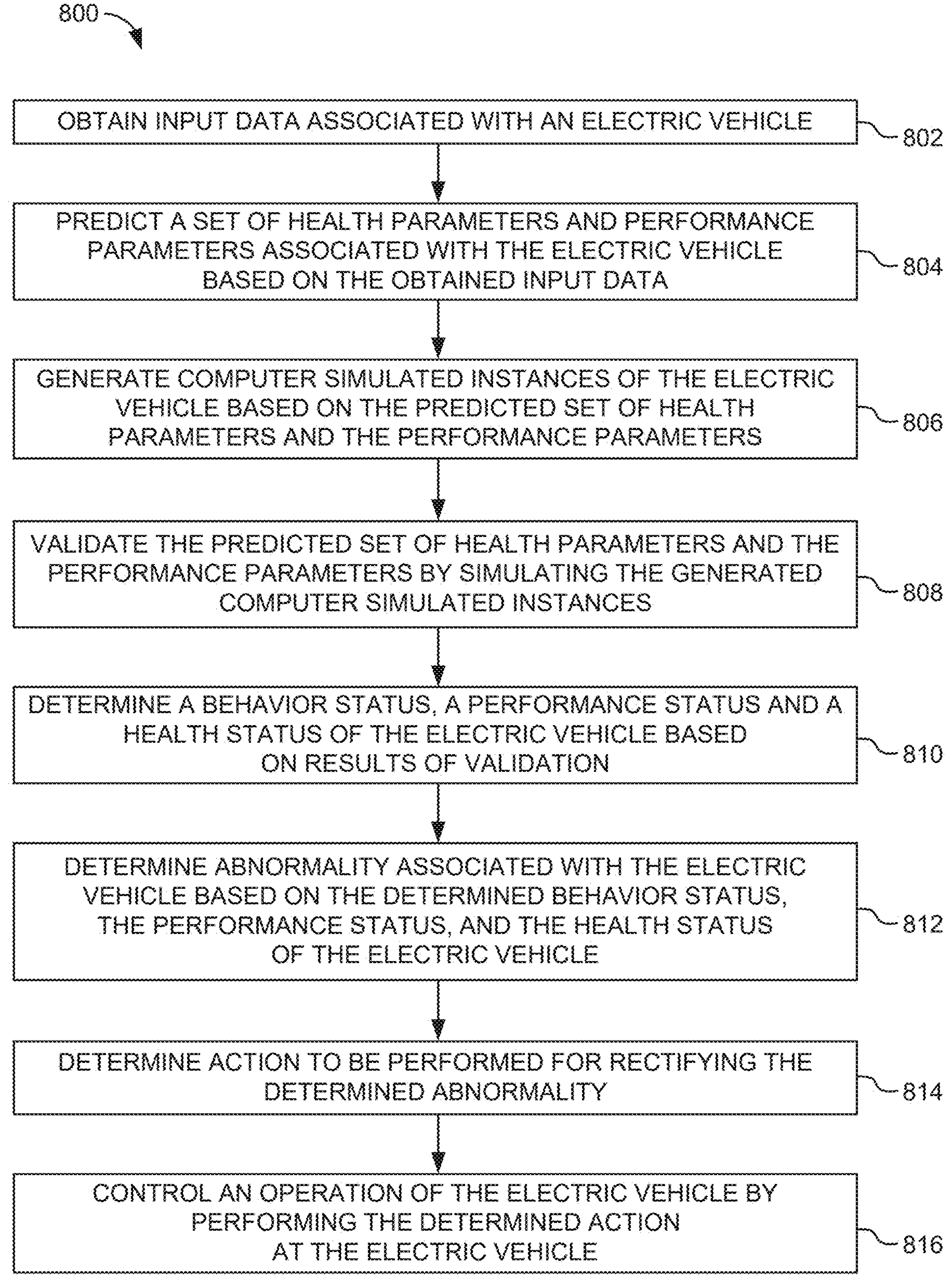
FIG. 8 illustrates a flow diagram of an example method implemented by the system, for electric vehicle operational optimization, in accordance with implementations of the present disclosure.

The method 700 may further include computing 708 the remaining useful life (RUL) of the battery in terms of charge/discharge cycles by using below expression:

$$RUL = \text{Cycles}_{EOL} - \text{Cycles}_{EOT}$$

wherein, $\text{Cycles}_{EOL}$ denotes end of life charge/discharge cycle; and $\text{Cycles}_{EOT}$ denotes end of tracking charge/discharge cycle FIG. 8 illustrates the flow diagram of an example method 800 implemented by the system 118, for electric vehicle operational optimization, in accordance with implementations of the present disclosure.

The method 800 may include obtaining 802 input data associated with the electric vehicle 110 from the plurality of data sources 218. The input data may include sensor data, battery data, vehicle health data, route data, and vehicle speed data, distance data, environmental data, and traffic data.

The method 800 may include predicting 804 the set of health parameters and performance parameters associated with the electric vehicle 110 based on the obtained input data using the trained machine learning model. The trained machine learning model may include, but not limited to, the extra tree regression model 406, the k-nearest neighbor model 408, and the decision tree regressor model 410.

The method 800 may include generating 806 computer simulated instances of the electric vehicle 110 based on the predicted set of health parameters and the performance parameters. Herein, the computer simulated instances may emulate the behavior and the performance of the electric vehicle 110. Specifically, generating 806 computer simulated instances of the electric vehicle 110 may include generating the digital twin model of the electric vehicle 110 based on the predicted set of health parameters and the performance parameters. Further, the digital twin model may include the set of parameters indicating the battery state of charge (SoC), the battery state of health (SoH), and the remaining useful life (RUL) of the electric vehicle 110.

The method 800 may include validating 808 the predicted set of health parameters and the performance parameters associated with the electric vehicle 110 by simulating the generated computer simulated instances of the electric vehicle 110 in the virtual environment using the trained machine learning model. The virtual environment may be configured to replicate the real-world driving condition. Further, the real-world driving conditions may include variations in terrain, traffic density, weather conditions, and road gradients.

The method 800 may include determining 810 the behavior status, the performance status and the health status of the electric vehicle 110 based on results of validation. Specifically, the behavior status may reflect behavior of the electric vehicle 110 in terms of the operational characteristics and responses to different driving conditions and scenarios. The performance status may reflect the overall performance of the electric vehicle 110 based on various metrics and criteria. The health status may reflect the overall health and condition of the electric vehicle 110, particularly focusing on the battery and other critical components.

The method 800 may include determining 812 one or more abnormality associated with the electric vehicle 110 based on the determined behavior status, the performance status, and the health status of the electric vehicle 110. The one or more abnormality associated with the electric vehicle 110 may may indicate underlying issues or deviations from expected behavior.

The method 800 may include determining 814 one or more action to be performed for rectifying the determined one or more abnormality using the machine learning (ML) model. The one or more action may include one or more recommendation on optimal operational parameters, battery charging stations, the travel route, and the drive mode of the electric vehicle 110.

The method 800 may include controlling 816 the operation of the electric vehicle 110 by performing the determined one or more action at the electric vehicle 110. Specifically, the electric vehicle 110 may self-drive the electric vehicle 110 in autonomous mode based on the behavior status, the performance status, and the health status of the electric vehicle 110. The autonomous mode may include controlling the vehicle speed, the vehicle steering, and/or the operation of the electric vehicle 110. Implementations of the present disclosure provides technical advancement the context of electric vehicle 110 operational optimization. For example, in the present disclosure, discloses the digital twin for operational optimization of electric vehicle 110. The key attributes of present disclosure may include energy efficient route selection, congestion free charging strategies along with the driving mode recommendations. The battery health monitoring parameters including State of Charge (SoC) and State of Health (SoH), vehicle range and remaining useful life of batteries are considered as essential input parameters for the system 118. The present disclosure may utilize SoC and SoH indicators which may provide the impending need to battery recharge when SoC is approaching threshold value and the remaining useful life of the battery in terms of charge/discharge cycles. Optimal route selection and advance charging slot reservation on that route may be dependent upon above mentioned performance indicators. Moreover, the digital twin model may provide structured and dynamic data from remotely located physical vehicles to implement ML modelling-based predictive analysis of battery state and may generate feedback controls for optimized electric vehicle 110 operations.

Additionally, in the present disclosure, the driver assistance recommendations assist the driver to choose a preferred driving pattern with respect to the remaining SoC of the battery and distance from the charging station so that the electric vehicle 110 may reach to charging station without fail. The key parameters involved in decision making may include vehicle weight, vehicle dimensions, vehicle speed/acceleration, road slope angle, road rolling resistance, gravitational acceleration, air density in the current area etc. Furthermore, in the present disclosure, the driver assistance recommendations, in addition to the electric vehicle 110 properties, may also consider road properties, environmental factors and driving pattern of the driver, thereby leading to safe driving, battery retention (hours), optimized energy consumption, estimated range and successful reachability to charging stations.

Further, by providing a comprehensive assessment of the electric vehicle's behavior, performance, and health, the evaluation module 212 may enables proactive management and optimization of the electric vehicle 110, leading to improved efficiency, reliability, and lifespan. The evaluation module 212, by gathering and processing this diverse set of real-time data, may gains a comprehensive understanding of the electric vehicle's 110 operating context, enabling the electric vehicle 110 to accurately assess the behavior, performance, and health. Moreover, by accurately and dynamically determining the drive mode, the evaluation module 212 may enables the system 118 to provide tailored recommendations and optimize energy consumption, contributing to a more efficient and personalized driving experience.

Further, by accurately calculating the inertial force value, the road slope force value, the road load friction value, and the aerodynamic drag force value, the evaluation module 212 may provide valuable insights into the electric vehicle's 110 energy consumption, range, and performance under different driving conditions. This information may be used to optimize driving behavior, improve energy efficiency, and enhance the overall driving experience.

Furthermore, by detecting and analyzing the abnormalities, the anomaly detection module 214 may provide insights into the electric vehicle's 110 condition and potential issues, enabling proactive maintenance, timely repairs, and improved safety.

Moreover, in the present disclosure, stacked generalization model 520 may be a powerful ensemble technique that uses the meta-model to intelligently combine the predictions of the plurality of the machine learning models, leading to accurate and reliable final prediction.

Figure 9:
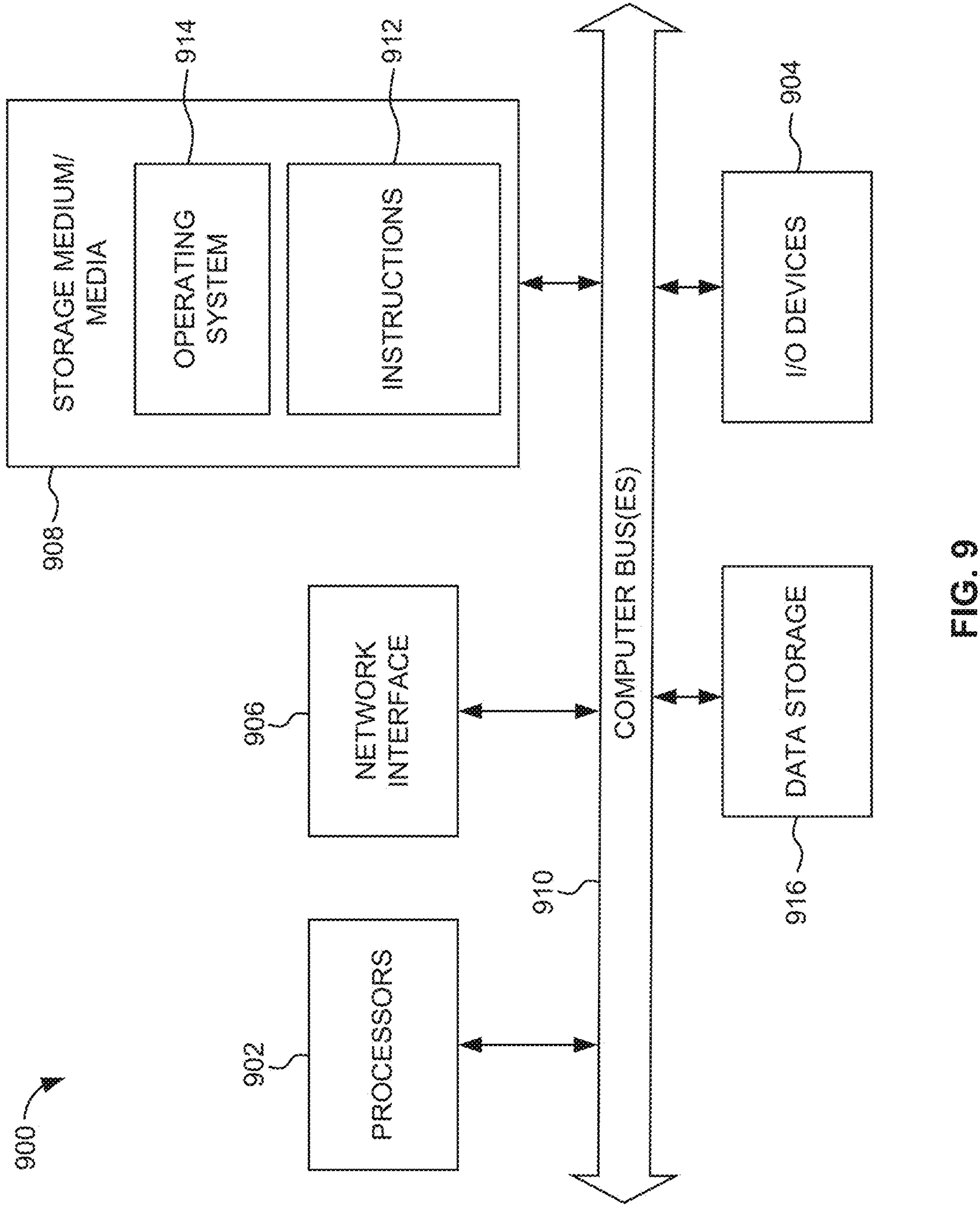
FIG. 9 illustrates a computer system that may be used to implement the system for electric vehicle operational optimization, in accordance with implementations of the present disclosure.

FIG. 9 illustrates a computer system 900 that may be used to implement the system 118 for electric vehicle operational optimization, in accordance with implementations of the present disclosure. More particularly, computing machines such as desktops, laptops, smartphones, tablets, and wearables which may be used to implement the tasks that may have the structure of the computer system 900. The computer system 900 may include additional components not shown and that some of the process components described may be removed and/or modified. In another example, a computer system 900 may be deployed on external-cloud platforms such as cloud, internal corporate cloud computing clusters, organizational computing resources, and/or the like.

The computer system 900 includes processor(s) 902, such as a central processing unit, ASIC or another type of processing circuit, input/output devices 904, such as a display, mouse keyboard, etc., a network interface 906, such as a Local Area Network (LAN), a wireless 802.11x LAN, a 3G or 4G mobile WAN or a WiMax WAN, and a computer-readable medium 908. Each of these components may be operatively coupled to a bus 910. The computer-readable medium 908 may be any suitable medium that participates in providing instructions to the processor(s) 902 for execution. For example, the computer-readable medium 908 may be non-transitory or non-volatile medium, such as a magnetic disk or solid-state non-volatile memory or volatile medium such as RAM. The instructions or modules stored on the computer-readable medium 908 may include machine-readable instructions 912 executed by the processor(s) 902 that cause the processor(s) 902 to perform the methods and functions of the system for electric vehicle 110 operational optimization.

The system may be implemented as software stored on a non-transitory processor-readable medium and executed by the processors 902. For example, the computer-readable medium 908 may store an operating system 914, such as MAC OS, MS WINDOWS, UNIX, or LINUX, and code for the system. The operating system 914 may be multi-user, multiprocessing, multitasking, multithreading, real-time, and the like. For example, during runtime, the operating system 914 is running and the code for the system is executed by the processor(s) 902.

The computer system 900 may include a data storage 916, which may include non-volatile data storage. The data storage 916 stores any data used or generated by the system.

The network interface 906 connects the computer system 900 to internal systems for example, via a LAN. Also, the network interface 906 may connect the computer system 900 to the Internet. For example, the computer system 900 may connect to web browsers and other external applications and systems via the network interface 906.

What has been described and illustrated herein is an example along with some of its variations. The terms, descriptions, and figures used herein are set forth by way of illustration only and are not meant as limitations. Many variations are possible within the spirit and scope of the subject matter, which is intended to be defined by the following claims and their equivalents.

Implementations and all of the functional operations described in this specification may be realized in digital electronic circuitry, or in computer software, firmware, or hardware, including the structures disclosed in this specification and their structural equivalents, or in combinations of one or more of them. Implementations may be realized as one or more computer program products (i.e., one or more modules of computer program instructions encoded on a computer readable medium for execution by, or to control the operation of, data processing apparatus). The computer readable medium may be a machine-readable storage device, a machine-readable storage substrate, a memory device, a composition of matter effecting a machine-readable propagated signal, or a combination of one or more of them. The term computing system encompasses all apparatus, devices, and machines for processing data, including by way of example a programmable processor, a computer, or multiple processors or computers. The apparatus may include, in addition to hardware, code that creates an execution environment for the computer program in question (e.g., code that constitutes processor firmware, a protocol stack, a database management system, an operating system, or any appropriate combination of one or more thereof). A propagated signal is an artificially generated signal (e.g., a machine-generated electrical, optical, or electromagnetic signal) that is generated to encode information for transmission to suitable receiver apparatus.

A computer program (also known as a program, software, software application, script, or code) may be written in any appropriate form of programming language, including compiled or interpreted languages, and it may be deployed in any appropriate form, including as a stand-alone program or as a module, component, subroutine, or other unit suitable for use in a computing environment. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform functions by operating on input data and generating output. The processes and logic flows may also be performed by, and apparatus may also be implemented as, special purpose logic circuitry (e.g., an FPGA (field programmable gate array) or an ASIC (application specific integrated circuit)).

Processors suitable for the execution of a computer program include, by way of example, both general and special purpose microprocessors, and any one or more processors of any appropriate kind of digital computer. Generally, a processor will receive instructions and data from a read only memory or a random-access memory or both. Elements of a computer can include a processor for performing instructions and one or more memory devices for storing instructions and data. Generally, a computer will also include or be operatively coupled to receive data from or transfer data to, or both, one or more mass storage devices for storing data (e.g., magnetic, magneto optical disks, or optical disks). However, a computer need not have such devices. Moreover, a computer may be embedded in another device (e.g., a mobile telephone, a personal digital assistant (PDA), a mobile audio player, a Global Positioning System (GPS) receiver). Computer readable media suitable for storing computer program instructions and data include all forms of non-volatile memory, media and memory devices, including by way of example semiconductor memory devices (e.g., EPROM, EEPROM, and flash memory devices); magnetic disks (e.g., internal hard disks or removable disks); magneto optical disks; and CD ROM and DVD-ROM disks. The processor and the memory may be supplemented by, or incorporated in, special purpose logic circuitry.

To provide for interaction with a user, implementations may be realized on a computer having a display device (e.g., a CRT (cathode ray tube), LCD (liquid crystal display) monitor) for displaying information to the user and a keyboard and a pointing device (e.g., a mouse, a trackball, a touchpad), by which the user may provide input to the computer. Other kinds of devices may be used to provide for interaction with a user as well; for example, feedback provided to the user may be any appropriate form of sensory feedback (e.g., visual feedback, auditory feedback, tactile feedback); and input from the user may be received in any appropriate form, including acoustic, speech, or tactile input.

Implementations may be realized in a computing system that includes a back end component (e.g., as a data server), a middleware component (e.g., an application server), and/or a front end component (e.g., a client computer having a graphical user interface or a Web browser, through which a user may interact with an implementation), or any appropriate combination of one or more such back end, middleware, or front end components. The components of the system may be interconnected by any appropriate form or medium of digital data communication (e.g., a communication network). Examples of communication networks include a local area network (LAN) and a wide area network (WAN), e.g., the Internet.

The computing system may include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the disclosure or of what may be claimed, but rather as descriptions of features specific to particular implementations. Certain features that are described in this specification in the context of separate implementations may also be implemented in combination in a single implementation. Conversely, various features that are described in the context of a single implementation may also be implemented in multiple implementations separately or in any suitable subcombination. Moreover, although features may be described above as acting in certain combinations and even initially claimed as such, one or more features from a claimed combination may in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products.

A number of implementations have been described. Nevertheless, it will be understood that various modifications may be made without departing from the spirit and scope of the disclosure. For example, various forms of the flows shown above may be used, with steps re-ordered, added, or removed. Accordingly, other implementations are within the scope of the following claims.

What is claimed is:

1. A system comprising:

a processor; and a memory communicably coupled to the processor, wherein the memory comprises processor-executable instructions which, when executed by the processor, cause the processor to:

obtain input data associated with an electric vehicle from a plurality of data sources, wherein the input data comprises sensor data, battery data, vehicle health data, route data, and vehicle speed data, distance data, environmental data, and traffic data;

predict a set of health parameters and performance parameters associated with the electric vehicle based on the obtained input data using a trained machine learning model;

generate computer simulated instances of the electric vehicle based on the predicted set of health parameters and the performance parameters, wherein the computer simulated instances emulate a behavior and a performance of the electric vehicle;

validate the predicted set of health parameters and the performance parameters associated with the electric vehicle by simulating the generated computer simulated instances of the electric vehicle in a virtual environment using the trained machine learning model;

determine a behavior status, a performance status and a health status of the electric vehicle based on results of the validation;

determine at least one abnormality associated with the electric vehicle based on the determined behavior status, the performance status, and the health status of the electric vehicle;

determine at least one action to be performed for rectifying the determined at least one abnormality using the trained machine learning model, the at least one action comprises at least one recommendation on optimal operational parameters, battery charging stations, a travel route, and a drive mode of the electric vehicle; and control an operation of the electric vehicle by performing the determined at least one action at the electric vehicle.

2. The system of claim 1, wherein to control the operation of the electric vehicle by performing the determined at least one action at the electric vehicle, the processor is configured to:

self-drive the electric vehicle in autonomous mode based on the behavior status, the performance status, and the health status of the electric vehicle, wherein in the autonomous mode, at least one of a vehicle speed, a vehicle steering, and an operation of the electric vehicle are controlled automatically.

3. The system of claim 1, wherein the processor is further configured to:

continuously obtain feedback on the determined behavior status, the performance status, and the health status of the electric vehicle from a user and the plurality of data sources;

determine a modified set of hyperparameters associated with the trained machine learning model based on the continuously obtained feedback; and fine-tune the trained machine learning model with the modified set of hyperparameters.

4. The system of claim 1, wherein to generate the computer simulated instances of the electric vehicle based on the predicted set of health parameters and the performance parameters, the processor is configured to:

generate a digital twin model of the electric vehicle based on the predicted set of health parameters and the performance parameters, wherein the digital twin model comprises a set of parameters indicating a battery state of charge (SoC), a battery state of health (SoH), and a remaining useful life (RUL) of the electric vehicle;

configure the generated digital twin model of the electric vehicle with the predicted set of health parameters and the performance parameters; and generate the computer simulated instances of the electric vehicle based on the configured digital twin model of the electric vehicle.

5. The system of claim 1, wherein to predict the set of health parameters and the performance parameters associated with the electric vehicle based on the obtained input data, the processor is configured to:

obtain a set of training data and a set of test data associated with the electric vehicle from the plurality of data sources;

train the machine learning model, wherein the machine learning model comprises an extra tree regressor model, a k-nearest neighbor model, and a decision tree regressor model with the obtained set of training data;

generate a first prediction result, a second prediction result, and a third prediction result from the trained extra tree regressor model, the trained k-nearest neighbor model, and the trained decision tree regressor model;

apply the first prediction result, the second prediction result, the third prediction result and the set of test data onto an Adaptive Moment Estimation (ADAM) optimizer model;

determine a plurality of weights corresponding to at least one of the trained extra tree regressor model, the trained k-nearest neighbor model, and the trained decision tree regressor model based on an output of the Adaptive Moment Estimation (ADAM) optimizer model;

determine an appropriate weight from among the determined plurality of weights corresponding to each of the trained extra tree regressor model, the trained k-nearest neighbor model, and the trained decision tree regressor model; and predict the set of health parameters and the performance parameters associated with the electric vehicle based on the determined appropriate weight.

6. The system of claim 1, wherein to validate the predicted set of health parameters and the performance parameters associated with the electric vehicle by simulating the generated computer simulated instances of the electric vehicle in the virtual environment using the trained machine learning model, the processor is configured to:

simulate the generated computer simulated instances of the electric vehicle in the virtual environment using the trained machine learning model, wherein the virtual environment is configured to replicate a real-world driving condition, wherein the real-world driving conditions comprise variations in terrain, traffic density, weather conditions, and road gradients;

generate simulation results for the electric vehicle based on the simulation of generated computer simulated instances, wherein the generated simulation results correspond to the predicted set of health parameters and the performance parameters;

compare the generated simulated results with actual electric vehicle operational data, and actual electric vehicle performance data using statistical error metrics;

determine deviations in the predicted set of health parameters and the performance parameters based on the comparison; and generate a plurality of performance scores for the electric vehicle based on the determined deviations.

7. The system of claim 1, wherein to determine the behavior status, the performance status and the health status of the electric vehicle based on the results of validation, the processor is configured to:

determine real-time vehicle properties, road properties, environmental factors, geographical factors and a driving pattern of a driver, wherein the vehicle properties comprise a vehicle mass, a gravitational acceleration, an air density, a vehicle frontal area, a vehicle speed and wherein the road properties comprise a road slope angle, and a road rolling resistance coefficient;

determine a drive mode of the electric vehicle based on the determined real-time vehicle properties, the road properties, the environmental factors, the geographical factors and the driving pattern of the driver, wherein the drive mode comprises at least one of a normal drive mode, an eco-drive mode and an aggressive drive mode;

compute an inertial force value, a road slope force value, a road load friction value, and an aerodynamic drag force value based on the determined real-time vehicle properties, the road properties, the environmental factors, the geographical factors, and the driving pattern of the driver;

determine a total force value, a total power consumed value, a total energy consumed value, a battery retention value, an estimated range, and a charging station distance value for the electric vehicle based on the computed inertial force value, the road slope force value, the road load friction value, and the aerodynamic drag force value;

correlate the determined total force value, the total power consumed, the total energy consumed, the battery retention value, the estimated range, and the charging station distance value with the drive mode of the electric vehicle; and determine the behavior status, the performance status and the health status of the electric vehicle based on the correlation.

8. The system of claim 1, wherein to determine the at least one abnormality associated with the electric vehicle based on the determined behavior status, the performance status and the health status of the electric vehicle, the processor is configured to:

compare the predicted set of health parameters and the performance parameters with a corresponding pre-stored threshold values;

determine a deviation in the predicted set of health parameters and the performance parameters based on the comparison;

compute a confidence score for the predicted set of health parameters and the performance parameters based on the determined deviation, wherein the confidence score indicates a performance level and a health status level; and identify the at least one abnormality associated with the electric vehicle based on the computed confidence score.

9. The system of claim 1, wherein to determine the at least one action to be performed for rectifying the determined at least one abnormality using the trained machine learning (ML) model, the processor is configured to:

receive a real-time battery data associated with the electric vehicle from the electric vehicle via a communication network;

generate a set of training data and a set of test data, from the received real-time battery data;

process the generated set of training data using the plurality of machine learning models, wherein the plurality of machine learning models comprise at least one of a feedforward neural network (FFNN), a gradient boosting regression (GBR), and a long short-term memory (LSTM) network;

generate a respective battery state of charge (SoC) prediction results based on an outcome of each of the plurality of machine learning models;

generate a final battery SoC prediction result by combining the generated respective battery SoC prediction results using a trained stacked generalization model;

refine the trained stacked generalization model based on the set of test data by applying the generated final battery SoC prediction result onto a transfer learning model;

generate synthetic datasets using the ML model, wherein the synthetic datasets simulate user conditions;

train the machine learning model by simulating the generated synthetic datasets in the virtual environment;

determine the at least one abnormality associated with the electric vehicle based on an output of the trained machine learning model; and determine the at least one action to be performed for rectifying the determined at least one abnormality at the electric vehicle based on the at least one abnormality, wherein the at least one action comprises at least one recommendation comprising driver assistance recommendations based on an analysis of traffic factors, environmental factors, and geographical factors using the trained machine learning model.

10. The system of claim 1, wherein to control the operation of the electric vehicle by performing the determined at least one action at the electric vehicle, the processor is configured to:

transmit at least one control signal to the electric vehicle to adjust at least one operational parameter based on a predicted route and energy consumption optimization strategy, wherein the at least one operational parameter comprises at least one of a speed, an acceleration, and a regenerative braking;

continuously receive the electric vehicle behaviour data and the performance data from the electric vehicle;

update the computer simulated instances of the electric vehicle in real time based on the continuously received vehicle behaviour data and the performance data; and dynamically tune the trained machine learning model, based on the updated computer simulated instances.

11. A method comprising:

obtaining, by a processor, input data associated with an electric vehicle from a plurality of data sources, wherein the input data comprises sensor data, battery data, vehicle health data, route data, and vehicle speed data, distance data, environmental data, and traffic data;

predicting, by the processor, a set of health parameters and performance parameters associated with the electric vehicle based on the obtained input data using a trained machine learning model;

generating, by the processor, computer simulated instances of the electric vehicle based on the predicted set of health parameters and the performance parameters, wherein the computer simulated instances emulate a behavior and a performance of the electric vehicle;

validating, by the processor, the predicted set of health parameters and the performance parameters associated with the electric vehicle by simulating the generated computer simulated instances of the electric vehicle in a virtual environment using the trained machine learning model;

determining, by the processor, a behavior status, a performance status, and a health status of the electric vehicle based on results of the validation;

determining, by the processor, at least one abnormality associated with the electric vehicle based on the determined behavior status, the performance status, and the health status of the electric vehicle;

determining, by the processor, at least one action to be performed for rectifying the determined at least one abnormality using the trained machine learning (ML) model, the at least one action comprises at least one recommendation on optimal operational parameters, battery charging stations, a travel route, and a drive mode of the electric vehicle; and controlling, by the processor, an operation of the electric vehicle by performing the determined at least one action at the electric vehicle.

12. The method of claim 11, wherein controlling the operation of the electric vehicle by performing the determined at least one action at the electric vehicle comprises:

self-driving, by the processor, the electric vehicle in autonomous mode based on the behavior status, the performance status, and the health status of the electric vehicle, wherein in the autonomous mode, at least one of a vehicle speed, a vehicle steering, and an operation of the electric vehicle are controlled automatically.

13. The method of claim 11, further comprising:

continuously obtaining, by the processor, feedback on the determined behavior status, the performance status, and the health status of the electric vehicle from a user and the plurality of data sources;

determining, by the processor, a modified set of hyperparameters associated with the trained machine learning model based on the continuously obtained feedback; and fine-tuning, by the processor, the trained machine learning model with the modified set of hyperparameters.

14. The method of claim 11, wherein generating the computer simulated instances of the electric vehicle based on the predicted set of health parameters and the performance parameters comprises:

generating, by the processor, a digital twin model of the electric vehicle based on the predicted set of health parameters and the performance parameters, wherein the digital twin model comprises a set of parameters indicating a battery state of charge (SoC), a battery state of health (SoH), and a remaining useful life (RUL) of the electric vehicle;

configuring, by the processor, the generated digital twin model of the electric vehicle with the predicted set of health parameters and the performance parameters; and generating, by the processor, the computer simulated instances of the electric vehicle based on the configured digital twin model of the electric vehicle.

15. The method of claim 11, wherein predicting the set of health parameters and the performance parameters associated with the electric vehicle based on the obtained input data comprises:

obtaining, by the processor, a set of training data and a set of test data associated with the electric vehicle from the plurality of data sources;

training, by the processor, at least one of an extra tree regressor model, a k-nearest neighbor model, and a decision tree regressor model with the obtained first set of training data;

generating, by the processor, a first prediction result, a second prediction result, and a third prediction result from each of the trained extra tree regressor model, the trained k-nearest neighbor model, and the trained decision tree regressor model;

applying, by the processor, the first prediction result, the second prediction result, the third prediction result and the set of test data onto an Adaptive Moment Estimation (ADAM) optimizer model;

determining, by the processor, a plurality of weights corresponding to at least one of the trained extra tree regressor model, the trained k-nearest neighbor model, and the trained decision tree regressor model based on an output of the Adaptive Moment Estimation (ADAM) optimizer model;

determining, by the processor, an appropriate weight from among the determined plurality of weights corresponding to each of the trained extra tree regressor model, the trained k-nearest neighbor model, and the trained decision tree regressor model; and predicting, by the processor, the set of health parameters and the performance parameters associated with the electric vehicle based on the determined appropriate weight, wherein the set of health parameters and the performance parameters comprise the state of charge (SoC) of a battery, the state of health (SoH) of the electric vehicle, the remaining useful life (RUL), and a range of the electric vehicle.

16. The method of claim 11, wherein validating the predicted set of health parameters and the performance parameters associated with the electric vehicle by simulating the generated computer simulated instances of the electric vehicle in the virtual environment using the trained machine learning model comprises:

simulating, by the processor, the generated computer simulated instances of the electric vehicle in the virtual environment using the trained machine learning model, wherein the virtual environment is configured to replicate a real-world driving conditions, wherein the real-world driving conditions comprise variations in terrain, traffic density, weather conditions, and road gradients;

generating, by the processor, simulation results for the electric vehicle based on the simulation of generated computer simulated instances, wherein the generated simulation results correspond to the predicted set of health parameters and the performance parameters;

comparing, by the processor, the generated simulated results with actual electric vehicle operational data, and actual electric vehicle performance data using statistical error metrics;

determining, by the processor, deviations in the predicted set of health parameters and the performance parameters based on the comparison; and generating, by the processor, a plurality of performance scores for the electric vehicle based on the determined deviations.

17. The method of claim 11, wherein determining the behavior status, the performance status and the health status of the electric vehicle based on the results of validation comprises:

determining, by the processor, real-time vehicle properties, road properties, environmental factors, geographical factors and a driving pattern of a driver, wherein the vehicle properties comprise a vehicle mass, a gravitational acceleration, an air density, a vehicle frontal area, a vehicle speed and wherein the road properties comprise a road slope angle, and a road rolling resistance coefficient;

determining, by the processor, a drive mode of the electric vehicle based on the determined real-time vehicle properties, the road properties, the environmental factors, the geographical factors and the driving pattern of the driver, wherein the drive mode comprises at least one of a normal drive mode, an eco-drive mode and an aggressive drive mode;

computing, by the processor, an inertial force value, a road slope force value, a road load friction value, and an aerodynamic drag force value based on the determined real-time vehicle properties, the road properties, the environmental factors, the geographical factors, and the driving pattern of the driver;

determining, by the processor, a total force value, a total power consumed value, a total energy consumed value, a battery retention value, an estimated range, and a charging station distance value for the electric vehicle based on the computed inertial force value, the road slope force value, the road load friction value, and the aerodynamic drag force value;

correlating, by the processor, the determined total force value, the total power consumed, the total energy consumed, the battery retention value, the estimated range, and the charging station distance value with the drive mode of the electric vehicle; and determining, by the processor, the behavior status, the performance status, and the health status of the electric vehicle based on the correlation.

18. The method of claim 11, wherein determining the at least one abnormality associated with the electric vehicle based on the determined behavior status, the performance status and the health status of the electric vehicle comprises:

comparing, by the processor, the predicted set of health parameters and the performance parameters with a corresponding pre-stored threshold values;

determining, by the processor, a deviation in the predicted set of health parameters and the performance parameters based on the comparison;

computing, by the processor, a confidence score for the predicted set of health parameters and the performance parameters based on the determined deviation, wherein the confidence score indicates a performance level and a health status level; and identifying, by the processor, the at least one abnormality associated with the electric vehicle based on the computed confidence score.

19. The method of claim 11, wherein determining the at least one action to be performed for rectifying the determined at least one abnormality using the trained machine learning (ML) model comprises:

receiving, by the processor, a real-time battery data associated with the electric vehicle from the electric vehicle via a communication network;

generating, by the processor, a set of training data and a set of test data from the received real-time battery data;

processing, by the processor, the generated a set of training data and a set of test data using a plurality of machine learning models, wherein the plurality of machine learning models comprise at least one of a feedforward neural network (FFNN), a gradient boosting regression (GBR), and a long short-term memory (LSTM) network;

generating, by the processor, a respective battery state of charge (SoC) prediction results based on an outcome of each of the plurality of machine learning models;

generating, by the processor, a final battery SoC prediction result by combining the generated respective battery SoC prediction results using a trained stacked generalization model;

refining, by the processor, the trained stacked generalization model based on the set of test data by applying the generated final battery SoC prediction result onto a transfer learning model;

generating, by the processor, synthetic datasets using the ML model, wherein the synthetic datasets simulate user conditions;

training, by the processor, the machine learning model by simulating the generated synthetic datasets in the virtual environment;

determining, by the processor, the at least one abnormality associated with the electric vehicle based on an output of the trained machine learning model; and determining, by the processor, the at least one action to be performed for rectifying the determined at least one abnormality at the electric vehicle based on the at least one abnormality, wherein the at least one action comprises at least one recommendation comprising driver assistance recommendations based on an analysis of traffic factors, environmental factors, and geographical factors using the trained machine learning model.

20. A non-transitory computer readable medium comprising a processor-executable instructions that cause a processor to:

obtain input data associated with an electric vehicle from a plurality of data sources, wherein the input data comprises sensor data, battery data, vehicle health data, route data, and vehicle speed data, distance data, environmental data, and traffic data;

predict a set of health parameters and performance parameters associated with the electric vehicle based on the obtained input data using a trained machine learning model;

generate computer simulated instances of the electric vehicle based on the predicted set of health parameters and the performance parameters, wherein the computer simulated instances emulate a behavior and a performance of the electric vehicle;

validate the predicted set of health parameters and the performance parameters associated with the electric vehicle by simulating the generated computer simulated instances of the electric vehicle in a virtual environment using the trained machine learning model;

determine a behavior status, a performance status and a health status of the electric vehicle based on results of the validation;

determine at least one abnormality associated with the electric vehicle based on the determined behavior status, the performance status, and the health status of the electric vehicle;

determine at least one action to be performed for rectifying the determined at least one abnormality using the trained machine learning (ML) model, the at least one action comprises at least one recommendation on optimal operational parameters, battery charging stations, a travel route, and a drive mode of the electric vehicle; and control an operation of the electric vehicle by performing the determined at least one action at the electric vehicle.

* * * * *